(12) United States Patent
Alves

(10) Patent No.: US 9,405,988 B2
(45) Date of Patent: Aug. 2, 2016

(54) LICENSE PLATE RECOGNITION

(71) Applicant: James Alves, San Diego, CA (US)

(72) Inventor: James Alves, San Diego, CA (US)

( * ) Notice: Subject to any disclaimer, the term of this patent is extended or adjusted under 35 U.S.C. 154(b) by 0 days.

(21) Appl. No.: 14/452,925

(22) Filed: Aug. 6, 2014

(65) Prior Publication Data

US 2015/0049914 A1 Feb. 19, 2015

Related U.S. Application Data

(60) Provisional application No. 61/865,529, filed on Aug. 13, 2013.

(51) Int. Cl.
*G06K 9/00* (2006.01)
*G06K 9/32* (2006.01)
*G06K 9/03* (2006.01)

(52) U.S. Cl.
CPC .............. *G06K 9/3258* (2013.01); *G06K 9/033* (2013.01); *G06K 2209/15* (2013.01)

(58) Field of Classification Search
None
See application file for complete search history.

(56) References Cited

U.S. PATENT DOCUMENTS

| 6,553,131 | B1 | 4/2003 | Neubauer |
| 6,747,687 | B1* | 6/2004 | Alves ............................ 348/148 |
| 7,339,495 | B2 | 3/2008 | Kavner |
| 8,265,988 | B2 | 9/2012 | Hedley et al. |
| 2005/0197976 | A1 | 9/2005 | Tuton et al. |
| 2011/0288909 | A1* | 11/2011 | Hedley et al. ................... 705/13 |
| 2013/0132166 | A1* | 5/2013 | Wu ......................... G07B 15/06  705/13 |

\* cited by examiner

*Primary Examiner* — Nirav G Patel
(74) *Attorney, Agent, or Firm* — Mark Wisnosky

(57) ABSTRACT

A license plate recognition and image review system and processes are described. The system includes grouping of images that are determined to be of the same vehicle, using an image encoded database such that verification of a license plate read is done through comparison of images of the actual vehicle to images from the encoded database and testing of the accuracy of a manual review process by interspersing previously identified images with real images being reviewed in a batch process.

12 Claims, 18 Drawing Sheets

LICENSE PLATE RECOGNITION

CROSS-REFERENCE TO RELATED APPLICATIONS

This application claims priority to U.S. Provisional application 61/865,529 titled License Plate Recognition, Filed Aug. 13, 2013, by the same inventor.

BACKGROUND OF THE INVENTION

1. Technical Field

The present invention relates to License Plate Image Review systems and methods for reading large numbers of images of license plates highly efficiently and at high accuracy.

2. Related Background Art

Roads and highways are becoming increasingly more automated. On toll roads, manual toll collection is being replaced by sensors and automatic license plate readers and manual image review systems. Toll systems are being set up to control, toll and in some cases restrict traffic not just on toll roads but congested inner city regions. Automated systems are required that recognize both subscribers to the systems and non-subscribes. Non-subscribers may include visitors from different regions and occasional users of the road systems being monitored. The systems are required to cost effectively recognize a wide variety of license plates and features on thousands of cars passing daily at speeds that require high-speed photography both night and day and in all drivable weather conditions and all ambient lighting situations. The conditions of the vehicles and the plates often make images amenable to automated character recognition difficult. Enforcement of tolls requires systems that are highly reliable and systems whose results can be verified. Accuracy requirements desire license plate number recognition with error rates at low parts per thousand. High failure rates result in lost revenue, significant verification costs and customer complaints and disputes related to billing. Current systems make limited use of all of the available system information available to support highly efficient license plate recognition systems and manual reviews. Such data includes multiple appearances of the vehicle during a single trip on the tollroad, combined with past recognition data, past road usage data, and vehicle specific information. The past results in the form of verified license plate reads can be used to detect errors and improve the system. The system should be capable of self-improvement as a database of verified reads of license plates is developed. There is a need for a system that takes advantage of the abundance of data in the form of individual successful and unsuccessful license plate reads that are often available. The system should be able to provide a confidence estimate for the read of a license plate and automatically improve this estimate with experience. The system should be able to be self-improving with respect to its own accuracy of license plate reads. Most optical character recognition ("OCR") techniques on the market today only process the gray-scale information in images, removing any color information from color images prior to processing. The system should make use of this color information to improve both automated and manual image processing efficiency and accuracy.

There is a need for an improved license plate reading system that is capable of error rates in the low part per thousand or better. There is a need for a system that judiciously uses manual verification. There is a need for a system that is self-improving over time using past data to improve future reads. There is a need for a system to empirically determine a confidence estimate for an individual read of a licenses plate and to use that experience to improve the read of the same license plate in a future traversal of the sensors and to improve the reading of other licenses plates through more accurate estimates of confidence in a read even of a different vehicle.

DISCLOSURE OF THE INVENTION

A system is described that addresses the deficiencies of the current art systems described above. A license plate reading system and method of use is described that makes use of multiple sources of current data and past experience to provide improved license plate recognition results.

Embodiments include the combination of using image recognition techniques to identify that multiple images include the same vehicle and grouping these images, further processing the images of the group using for vehicle identification using Optical Character Recognition (OCR), verification of the identification of the vehicle through both automated and manual techniques. In one embodiment the manual verification of the identification of the vehicle uses a vehicle registration database that is encoded in the form of images such that manual review is done through matching images of a vehicle to be identified with images generated from data from the vehicle registration database. In another embodiment the attentiveness and accuracy of manual reviewers is tested by inclusion of previously identified images from a database within their work flow of images that are presented for review to ascertain their ability to accurately identify these test images. The reviewers' ability to accurately identify test images is used as an indicator of their accuracy on all images in a batch presented for review and verification. Vehicle Signature Recognition (VSR) technologies that produce a "fingerprint" to recognize a vehicle independently from the numbers on a license plate and creation of a database associating the vehicle signature with the license plate characters are integrated into a verification process. In a preferred embodiment, grouping of images is done prior to recognition of the characters on the license plates of the vehicle thereby providing multiple data examples for improving the rate of accurate reading of the characters on the plates. In one embodiment the reading of the characters on the plates in one of the grouped image sets is applied to all images within the group identified as the same vehicle. In another embodiment a confidence level is determined for the reading of the characters on the plates in an image and the confidence level for reading the characters in one of the grouped images is assigned to all images within the same group. In another embodiment the confidence level for the reading of the characters on the license plate of the vehicle identified in a group is calculated on the basis of multiple images within the group. Grouping is also used to automate transactions that have low or even zero OCR read confidences and therefore otherwise would have to be sent to manual reading and review. A transaction contains all the images captured of a vehicle and its license plate as it passed through a single tolling location on the roadway. Grouping typically contains the images from multiple transactions. Current image review systems only use the images from a single transaction to try and read the vehicle's plate whereas this invention uses the images from multiple transactions to simultaneously improve the number of transactions automatically read and their accuracy.

Multiple images, including both front and rear of the vehicle are used to arrive at license plate read results for a transaction. A "transaction" in this document refers to the acquisition of an image or multiple images of a vehicle and associated data such as date, time, location, vehicle class, etc.

used to determine the toll charge at a single toll location on a roadway. A car travelling a roadway in a single trip may be subject to multiple transactions. The follow on processes may include identification of the vehicle, identification of the plates on the vehicle reading the characters of the plates on the vehicle, billing the owner of the vehicle as identified through the plates and receiving payment. In many instances a transaction may refer to any single step such as an image acquisition transaction. In one embodiment images of both the front and rear of the vehicle are generated. In a preferred embodiment image data of the gross overall vehicle and characteristics combined with the details found in the region of the license plates are used to uniquely identify the vehicle and group images of the same vehicle. In this preferred embodiment grouping does not include identification of the characters of the license plates or the type of vehicle, but rather image features such as lines, geometric shapes, and colors. In one embodiment template matching of multiple images of the vehicle is used to group images as being from the same vehicle. Color camera image information is also exploited to improve both human and machine plate read accuracy and efficacy.

In another embodiment images are matched and used to group multiple transactions from the same vehicle as it passed through multiple tolling points over a time period spanning a single trip. In another embodiment images from previously captured transactions from a similar time period from a preceding day (or day of week) is used to group transactions. In this embodiment the images may not be from the same trip of a vehicle through a tolling point but rather from multiple trips.

In one embodiment grouping of transactions enables applying high confidence reads by OCR in one transaction to be applied to other transactions without the need for manual operations. Different lighting conditions typically result in variations of OCR confidence levels, sometimes dipping below a pre-selected threshold required for a confirmed identification. Groups often contain transactions with lower confidence OCR reads and transactions with higher confidence OCR reads. As long as the OCR reads in the Group do not conflict, then the transactions with lower-confidence reads can be assumed to be as accurate as a high-confidence read result. This then provides a means to dynamically adapt OCR confidence thresholds to produce more automated reads of transactions while maintaining a low error rate. Grouping also aids in the verification of licensing plate reads. If all the transactions in a Group are low-confidence OCR reads, but one (or more) of the transactions in the group can be verified with a high confidence by matching a fingerprint in the VSR fingerprint library at high confidence then all the transactions in the group can automatically be declared to match a known good read.

In another embodiment, grouping is used to reduce the amount of human review needed for those vehicles whose plates cannot be automatically read by either OCR or VSR fingerprint matching. In one embodiment, only one transaction in the group is read manually by a human reviewer and that read is used as the read answers for all the other transactions in the group automatically. This procedure can be applied both to the initial identification of the characters on the license plate as well as to verification of the read process.

The process for reading license plates at high accuracy includes an initial read of the characters of the plate as well as verification that the reading is accurate. In one embodiment includes comparing the license plate read results with previously identified vehicles on the same roadway. It is common for vehicles to repeatedly transit the same roadway or section of the same roadway. Repeated identification of the vehicle increases the confidence in the read and allows verification to be automated based upon a repeated read of the same plate. In another embodiment the identification through reading of the license plate characters of a vehicl e that has not previously been identified on the roadway is subjected to additional verification steps. Again grouping of the images of the vehicle aids in simplifying the verification step. In another embodiment previously read plates that were subsequently denied by the customer as being on the roadway at the time of identification are placed in a sensitive plate database and verification is required in subsequent reads that result in the same set of characters. In another embodiment verification of the license plate reads is done by comparison of the vehicle type with the vehicle type recorded in a government registration or other verified database. In one embodiment the database is encoded as images such that verification is done by comparison of the image of the vehicle on the roadway with an image that encodes the data in the database. Nonlimiting exemplary encoding of the image includes using images of vehicle type, vehicle manufacturer emblems and vehicle colors. In another embodiment a plausible plate list is used. This is a database of the license plates that have been known to occur on the particular road where plates are to be recognized. In one embodiment the plausible plate list is initialized from the list of plates that have been previously identified and the customer's paid their bill with no billing disputes. After the initial load, the plausible plate list is updated automatically by the license plate recognition system as it reads new plates. This list is typically smaller than the list of all registered plates in the state or locale where the road is located. It has been shown in practice that when a read error is made, it is not very likely to appear on the plausible plate list. This is what makes use of the plausible plate list a powerful tool for detecting plate read errors. Most image review systems in use today, merely use the entire list of all currently registered plates in a State as a check to see if a plate read is in error. The problem with this approach is that there is a high probability that a plate read error will be a registered plate somewhere in the State of issuance. The plausible plate list is a much smaller list of the plates that have occurred on the particular toll road and since not all vehicles in any given State will travel on that particular toll road, the probability that a miss-read plate will appear on this list is greatly reduced.

In another embodiment, if the read for a video transaction does not appear on the plausible plate list then it is sent to a special queue to validate whether the make/type/color of the vehicle matches the department of motor vehicle or other registrar data for that plate. The type of vehicle is whether the vehicle is a car or a truck, a sedan or coupe, whether it has four doors or two, whether it is a van and so forth. In another embodiment the type of vehicle further includes model and color. If the vehicle information matches what appears in the image then the read is correct and the read is added to the plausible plate list. In another embodiment the vehicle signature is also added to the vehicle signature database as well. If the vehicle information does not match the vehicle information derived from the DMV, then the transaction is sent to a highly experienced reviewer to carefully determine what the correct plate read should be. So as new plates appear on the particular road that the license plate image review system was intended to process, these new plates are added to both the plausible plate list and they and their corresponding vehicle signature are added to the VSR database.

In another embodiment a further database called the sensitive plates list is used to improve accuracy. The Sensitive Plates list is a database of previously identified license plates for which a toll has been billed but the customer instead of paying complained that they incorrectly received the bill and a subsequent manual investigation confirmed it was indeed a read error made by the Image Review System. The database is designed to stop the license plate image review system from automatically sending incorrect plate reads to the toll billing system for a customer that has previously complained that they received a false bill.

In another embodiment the system measures the confidence probability for a license plate read based upon a non-limiting list of factors that include whether the plate includes known difficult to read numbers and letters, whether the plate is in a global data base of license plates, whether the plate is in a local database of frequent users of a road segment and accuracy estimates for a manual reviewer is used. In another embodiment the manual review includes alerting the reviewer to known difficult reads. In another embodiment manual review is done in a batch process in which known test images are mixed in with real time data images and the test images are used to estimate the reviewers accuracy. In another embodiment vehicle signature features are used to improve confidence in the license plate recognition. In another embodiment a set of logic rules are used to decide when a manual review of the license plate read is required. In another embodiment the confidence estimate for a license plate read is determined empirically based upon past data that includes known successful reads as well as unsuccessful reads. In another embodiment successful read determination includes billing and receipt of payment.

With automated processing producing extremely accurate read results, the human readers become the largest source of system read errors. Regular monitoring of human reviewer errors becomes critical to maintain an overall high accuracy of the Plate Image Review System. In one embodiment human error is monitored through probe transactions and by comparing each individual reviewer's plate read answers to final plate reads. Operators of the System select and maintain a library set of transactions (Probes) with known accurate plate read results. These Probe transactions are used to occasionally probe the read accuracy of individual human reviewers. Probe transactions are automatically inserted into a reviewer's work queue at a pre-selected rate. If a reviewer is found to be making too many errors on probe transactions an alert is issued and the batch of transactions the reviewer reviewed are considered suspect in terms of overall accuracy. In one embodiment the alert further includes halting the current reviewer from reviewing any further transactions and sending their most recent set of transactions to re-review by other (more accurate) reviewers to be re-processed.

In another embodiment double blind reviews are combined with probes to improve accuracy. Double-blind validation means, that to be accepted as a final license plate read result, any data entries involving manual image review must be corroborated by an independent second process, either an OCR result agrees or a different human reviewer agrees with the first. Double-blind review is very good at detecting and preventing typographical mistakes from causing toll bills to be sent to the wrong registered vehicle owner but it does a very poor job of detecting what are called perceptual inattentiveness errors. Inattentiveness errors occur when a reviewer does not pay sufficient attention to the small differences between certain characters that are often tricky to distinguish from one another. Examples include the characters Q and O and the characters B and 8. Inattentiveness errors are rarely detected by double-blind review because inattentiveness errors are highly correlated between two different human reviewers and even between OCR and humans. Probe transactions are specifically chosen to contain plates that have easily confused characters with an image quality that, while accurately readable, requires a reviewer to be paying careful attention to get the right answer. Probes check to see if the reviewers are paying attention to the situations that can be easily misread. Probes are inserted into batches of transactions being read by a human reviewer. If too many probes are read incorrectly then the entire batch of transactions is considered suspect in terms of accuracy, so the reviewer and their supervisor are alerted that the attentiveness accuracy is too low to allow their most recent batch of reviews to be sent onward to billing. The batch is then diverted to another reviewer known to have higher probe accuracy to be re-reviewed. This prevents human inattentiveness errors from resulting in false toll bills, thereby decreasing toll operations costs given the high relative cost of responding to and correcting customer billing completes compared to the costs of image re-review.

In another embodiment, probe transactions are selected by an administrator from a library of probe transactions. The library typically consists of those plate examples from various States that have easily confusable characters. A system performance report allows selection of those most likely to cause inattentiveness errors for both the manual review operator being tested as well as the particular types of license plates identified by other reviewers as difficult to read. The report includes error rates for plates that allow selection of plates that are known to be difficult to recognize. In another embodiment probes are regularly updated and changed so that reviewers do not become accustomed to a specific probe set over time.

MODES FOR CARRYING OUT THE INVENTION

The invented system includes hardware and processes to allow accurate reading of license plates on a vehicle typically moving at high speeds on a road.

Figure 1A:
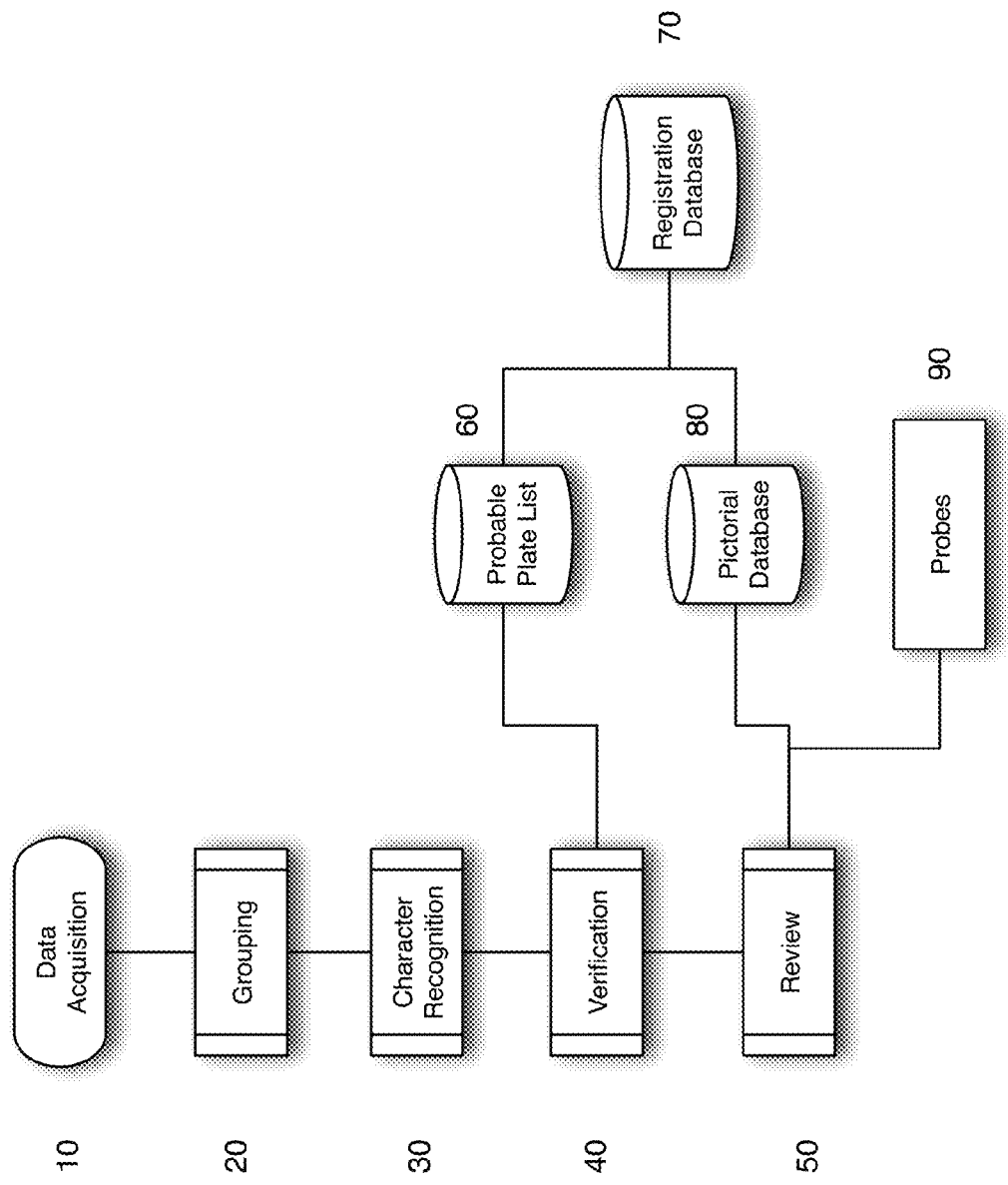
FIG. 1A is a block diagram of some features of the invention.

Referring to FIG. 1A some features of the invented system are shown. The license plate recognition system begins with data acquisition 10. Data acquisition includes obtaining a digital photographic image of the vehicle and its license plate. In the preferred embodiment the image includes both front and rear views of the vehicle with sufficiently detailed image resolution of the license plate and vehicle region(s) to allow for visual identification of the make or manufacturer of the vehicle, the type of vehicle, the model of the vehicle, the coloration of the vehicle. In the preferred embodiment multiple images of the same vehicle are acquired at separate tolling locations or at the same tolling station at different points in time and the detailed regions in the acquired images allow determination that the same vehicle appears in the multiple images without character recognition of the characters on the vehicle's license plate. Collectively this identification of the same vehicle in multiple images is termed "grouping" 20. Grouping of images is used to aid in the license plate recognition process in numerous methods described further below. In one embodiment the grouped images use the same character recognition results without the need to do character recognition on all images within the group. In another embodiment the grouped images share confidence levels for the character recognition. In some embodiments grouping includes identification of the type of vehicle and detailed image matching. In another embodiment these signatures are augmented with the edges that naturally appear at vehicle seams and at transitions from/to various vehicle body parts or at the vehicle graphical emblem or make/model text. In another embodiment grouping includes matching the colors and graphical patterns used on the license plate. License plate colors and graphics are frequently an indicator of the state or country of origin of the license plates.

In another embodiment other data acquisition to identify the vehicle for grouping 20 is acquired 10. Non-limiting other identification include radio frequency identification tags, magnetic signatures and other measurements that individually and collectively provide data to identify a particular vehicle without character recognition of the characters on the license plate attached to the vehicle.

The data collected allows for grouping 20 of transactions for the same vehicle across multiple transactions. A transaction is defined as a single occurrence of a vehicle passing through a tolling point on a road. Grouping is determining that the same vehicle is in multiple images of the vehicle on the basis of details within the images and other data collected that does not include character recognition of the characters on the license plate. In the preferred embodiment grouping is on the bases of images of the vehicle including fine details in the region of the license plate and grouping is based upon template matching of images collected at different toll points within a relatively short time window or across subsequent days at similar times of day at the same toll point. The image matching allows positive determination that the image is of the same vehicle even though the particular vehicle is not identified through characters on the license plate or otherwise. In the preferred embodiment the grouping is for a single trip of the vehicle down a road with multiple tolling sites. The grouped transactions are therefore also temporally related by the logical time the same vehicle would pass each of the tolling points. Grouping provides additional example images for the plate character recognition process 30. For example, it is possible that only a portion of the characters can be recognized from one of the images or that the confidence level of the character recognition in a single image does not meet a preselected confidence level for positive character recognition, but the confidence levels in the pooled data may exceed the preselected level to allow for automatic positive recognition of the characters. In another embodiment, the highest confidence level for identification of characters in a group is applied to all transactions within the same group. Grouped transactions are used collectively to identify the characters 30 for the transaction in the same group. Grouping may be done across parts of a single trip through the tolling stations or may be for the same vehicle identified in multiple trips through the same set of tolling stations. Characters are recognized 30 using optical character recognition (OCR) as is know in the art.

The recognized characters are then verified 40. In one embodiment verification means checking that the vehicle and the characters on the plate both match data from the registration database 70. The registration database 70 is a database of the vehicle license plate characters that are on the plates of a particular vehicle and include vehicle information. Nonlimiting exemplary data included in the registration database includes the vehicle Identification number (VIN) associated with vehicle upon which the particular plates were installed, the type of vehicle, and the make, model and color of the vehicle. Collectively the exemplary data represents a "vehicle signature". In another embodiment verification is through a probable plate list database 60 that includes vehicles that have been previously detected at the same tolling points. Identification of repeat users of the same roadway increases the confidence of the character recognition and provides verification. That is in one embodiment the verification is that the vehicle signature recognition matches that of the data within the license plate vehicle registration database. In another embodiment the verification is that the characters and vehicle have been previously identified and verified as users of the roadway and have thereby been entered into a probable plate list 60 database. The probable plate list database may include the same type of data as within the registration database but further includes previously verified transaction for the particular vehicle and the particular characters previously identified on the same roadway. Nonlimiting identification of the type of vehicle includes images to distinguish whether the vehicle is a motorcycle, car, pickup truck, van, sports utility vehicle or larger cargo carrying truck. The identification of the type of vehicle further includes such information as the number of doors, whether the vehicle is a coupe or sedan. In another embodiment the identification of the type of vehicle includes the model of the vehicle. As an example a vehicle may be identified as a two-door coupe, made by the manufacturer Honda and the model may be further identified as a Honda Accord or a Honda Civic (the terms Honda, Accord and Civic are registered trademarks of the Honda Motor Company Limited, Corporation of Japan). The images further include the ability to identify the color of the vehicle. In one embodiment the system includes color variation semaphore images to assist in comparing vehicle color descriptions provided by state DMV databases to the images of the vehicles that these DMV provided descriptions are being compared to. Vehicle signatures are then extracted from the images.

Verification may include further review 50 of the transaction data. In one embodiment the review is a manual review of the transaction data within a group. In a preferred embodiment the review is of a single member of the grouped transactions. The single transaction to be reviewed may be selected on the basis of the confidence level in the character recognition. In one embodiment the transaction with the highest confidence level is manually reviewed and if manually verified all transactions within the same group are verified. In another embodiment a transaction is selected for review if the recognized characters for the transaction do not match the recognized characters for other members of the group.

In another embodiment the transactions in a group are reviewed if the vehicle and recognized characters have not previously been seen on the roadway location of the toll station. In another embodiment the transaction is reviewed if the vehicle signature data and the license plate character data do not match the corresponding vehicle and license plate data within the registration database 70. The transactions, once verified are entered into the probable plate list 60 database. The review process as part of verification further includes a pictorial database 80. The pictorial database represents encoding the data items within a vehicle registration database in a pictorial form. In this manner the reviewer compares visual data with the images of the acquired data 10 for the transaction rather than textual information. Nonlimiting exemplary encoded visual information includes images of the branding logos affixed to vehicles that identify the manufacturer of the vehicle, vehicle type that show images of cars trucks, motorcycles, coupes, sedans, convertibles, etc., color palettes showing images of the vehicle colors as they would appear on the surface of the vehicle and model or body features that can identify particular models of vehicle types as produced by particular manufacturers. The manufacturer is textually identified in the registration database either as a manufacturer name in text or encoded in the vehicle identification number as is known in the art or both. In the preferred embodiment during the review process the data from the acquired images of the vehicles on the roadway is pictorially matched to the images from the database to confirm or identify the vehicle make, type, model, color, etc.

The review process further includes probes 90 to test the accuracy and attentiveness of the reviewers. In one embodiment, transactions that have been previously identified and confirmed are mixed in with the work stream for the reviewers to test that the reviewer accurately identifies the known transaction data. In one embodiment the probes are selected from past transaction data that is known to include images and characters that have previously been identified with low confidence and are know to be difficult to identify images. In the preferred embodiment the probes are not previously seen by the reviewer. Failure of the reviewer to accurately identify the data within the probes results in verification data from that reviewer to be rejected or in another embodiment re-checked by a second reviewer. Details of the features introduced in FIG. 1A are further defined and expanded upon in the figures and text to follow. Although shown as a flow chart implying a linear process in FIG. 1A, embodiments of the invention include altering the order of steps defined in FIG. 1A. Many of the steps are done automatically using a computing device and the order of the computer processing may be varied or even simultaneous in a multi-thread computing environment as is known in the art.

Figure 1B:
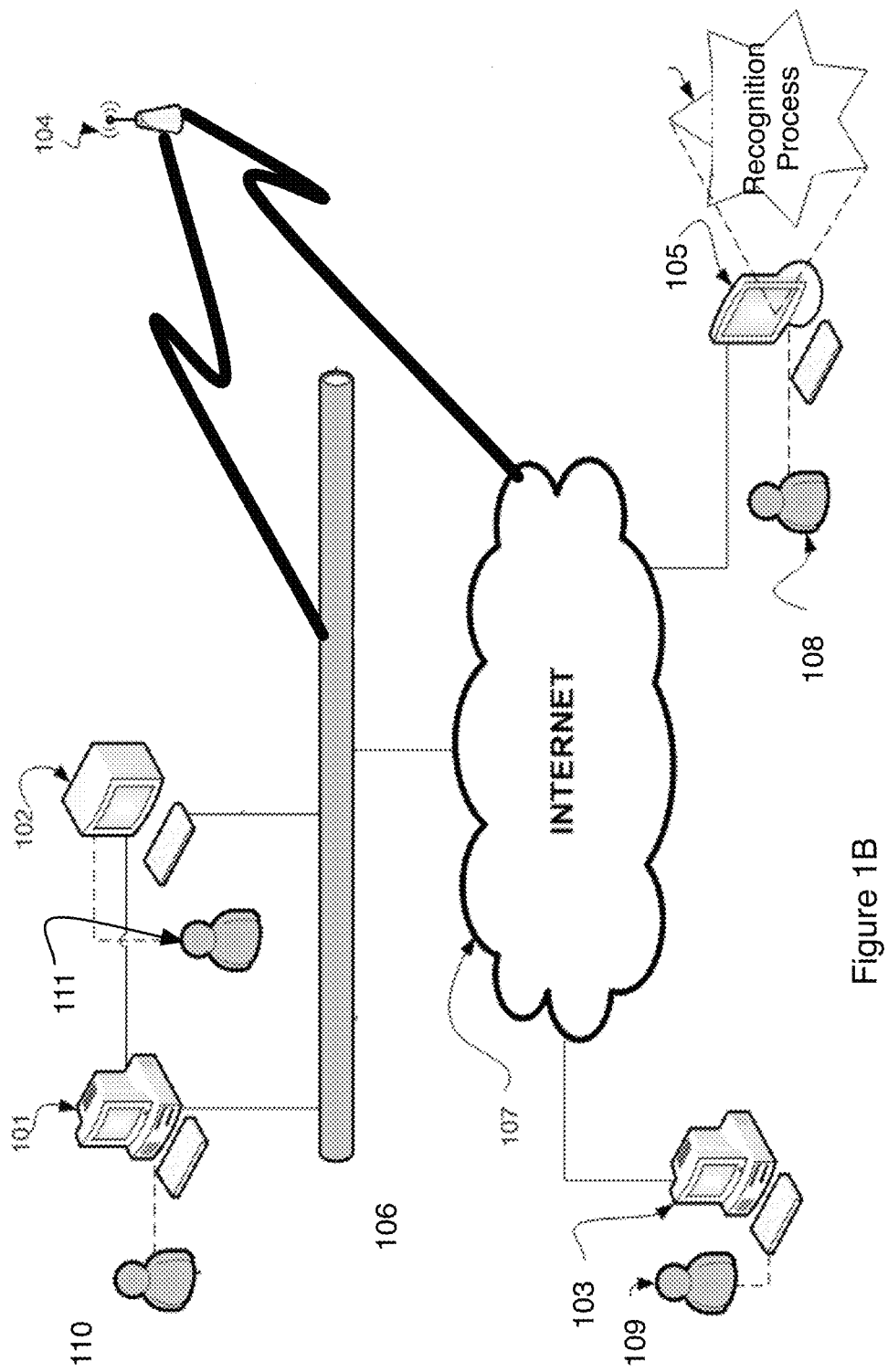
FIG. 1B is a block diagram showing a system for practicing the invention.

Referring to FIG. 1B an exemplary system used to practice the invention is shown. A sensor 104 sends data from an acquired signal regarding a passing car to a computing system 105. The sensor includes a camera for taking an image of the license plate on the vehicle. In another embodiment the sensor further includes cameras for taking photographs of both the license plate and the vehicle. In another embodiment the sensor includes both visual and other vehicle identification measures such as radio frequency identification of tags on a passing vehicle. The sensor system is described in more detail in conjunction with FIGS. 2 and 3. The system further includes computing systems 101, 102, 103, 105. The computing system includes components known in the art for computing systems, including a user interface, electronic memory storage, electronic processors and input/output ports to communicate electronically with other devices. The connection between the data acquisition system 104 and the computing systems 101, 102, 103, 105 may be wired or wireless and may be through a local network 106 or through the Internet 107 or both. The computing systems are programmed with license plate recognition software that analyzes the data from the sensor 104 and identifies the characters on the license plate of vehicle passing the sensor and thereby identifies the vehicle and vehicle owner. The system further includes operators 108, 109, 110 and 111. The operators may operate at the computer that includes the recognition process or may operate at computers linked to the recognition process computer via a local network, or through the Internet. The multiple computers in the system 101, 102, 103, 105 may be programmed to display data from the remote sensor 104 for review by operators 108, 109, 110, 111. In one embodiment all operations are on a single computer with a single operator for review (for example just 105, 108). In another embodiment as shown a plurality of computers and operators are included. The recognition process includes automated analysis and recognition of the license plat and identification of the vehicle and owner as well as a decision system to include manual review by one or more operators 108-111. In one embodiment at least one of the operators/computers is used for billing of the owner of the vehicle identified as passing the sensor 104. Bills may be sent to the identified owners of the vehicle either electronically or through printing and regular mail. The billing system further includes information related to paying of the bills by customers. This information may be obtained through electronic links to banking systems (not shown). The computing systems include storage for transaction data that includes identification of passing vehicles, identification of owners of passing vehicles through motor vehicle registration systems and billing and payment records for the transactions where the vehicle is identified as passing a tolling point on a road.

Figure 2:
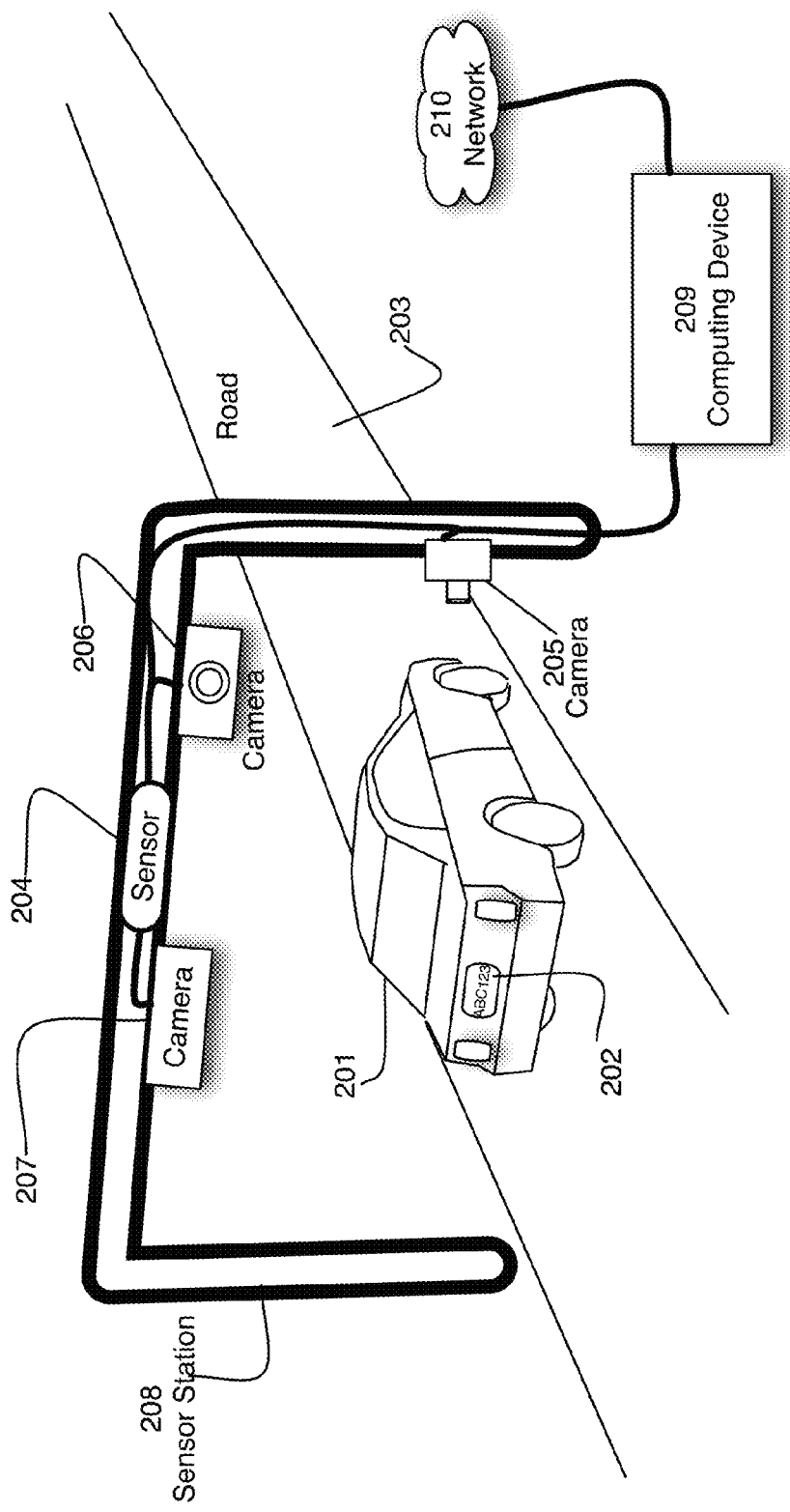
FIG. 2 is a diagram of a typical single data acquisition unit.

Referring now to FIG. 2 a sensor system is shown. A vehicle, having a license plate 202 is traveling along a road 203. As the vehicle passes a sensor station 208 it is photographed by one or more cameras 205, 206, 207. The cameras may be positioned to acquire images of the front of the vehicle, the rear of the vehicle and the sides of the vehicle or all of the above. In one embodiment the acquisition of the image is triggered by a sensor 204 that detects the presence of the vehicle such as a radar sensor. In another embodiment presence of the vehicle is detected by motion in the acquired video images form the cameras. In another embodiment the vehicle is detected by breaking a light sensor. In another embodiment the vehicle is detected using a magnetic sensor in the roadway. The detector may be an optical sensor or radar sensor or may be motion detection within a camera system. The cameras may acquire images just as a vehicle passes or may acquire images continuously and select those images where there is motion and a vehicle is detected. The sensors and cameras are connected to a computing device 209 that is further connected to a network 210 for sending acquired images to data processors for license plate recognition. In one embodiment the license plate recognition is accomplished locally. In another embodiment the data is sent to a remote location and license plate recognition is done remote from the sensor system. In other embodiments the sensors may further include sensors that read radio frequency identification tags on a vehicle and make measurements of the vehicle including vehicle size, shape and weight. In these cases the sensors may include radar sensors, reflected structured light sensors and weight sensors such as strain gauges built into the pavement over which the vehicle is passing.

Figure 3:
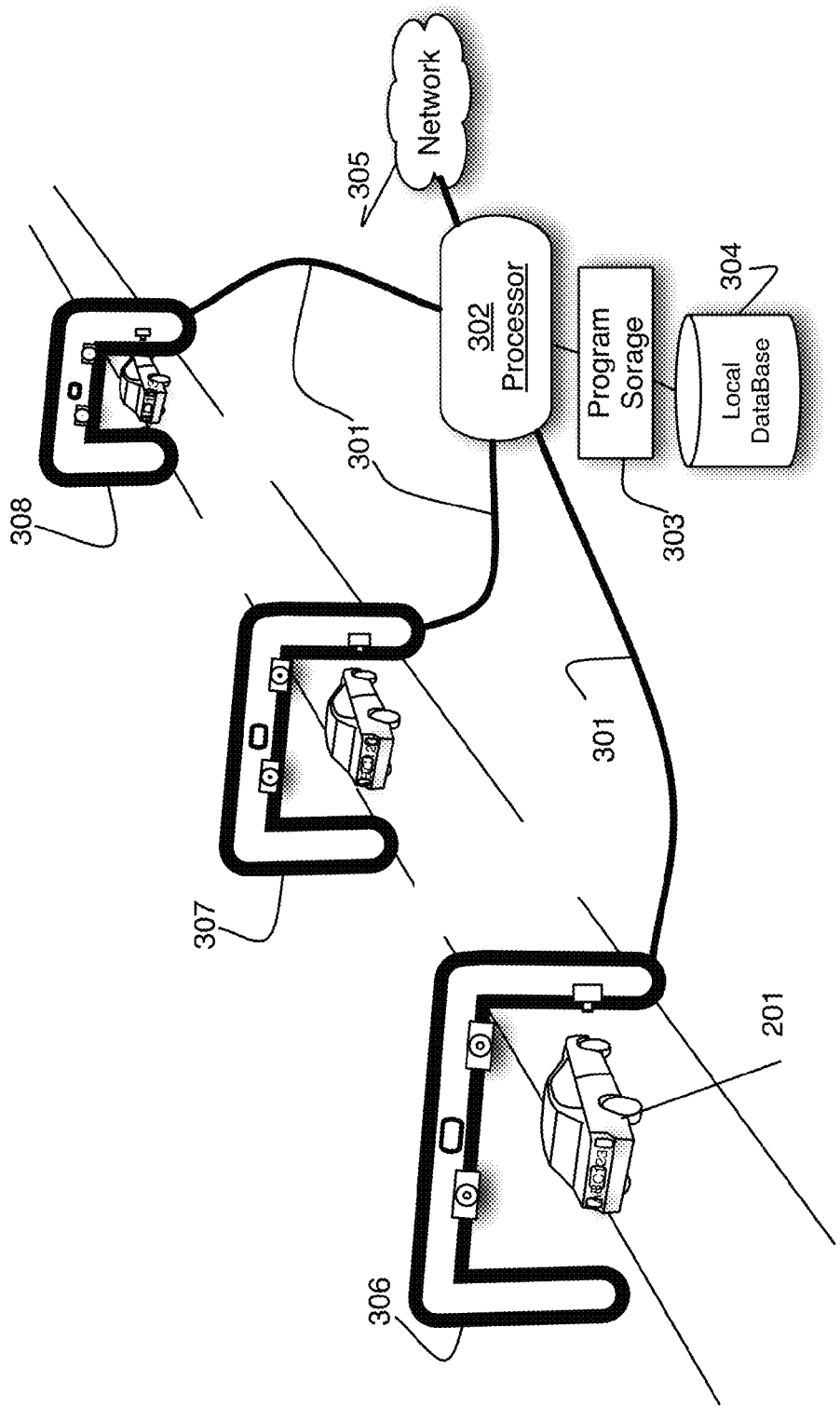
FIG. 3 is a diagram of use of multiple data acquisition units.

In another embodiment shown in FIG. 3 there are multiple sensor stations 306, 307, 308. The sensors may acquire images independently or in a coordinated fashion and are interconnected 301 through a local network or through the Internet to a processor 302 that may further include program storage including license plate recognition processing 303 and local storage 304 of data and database information related to license plate recognition. The system may be further networked 305 to remote processors for license plate recognition and billing. The connection may be through any wired or wireless network as known in the art and the Internet.

Figure 4A:
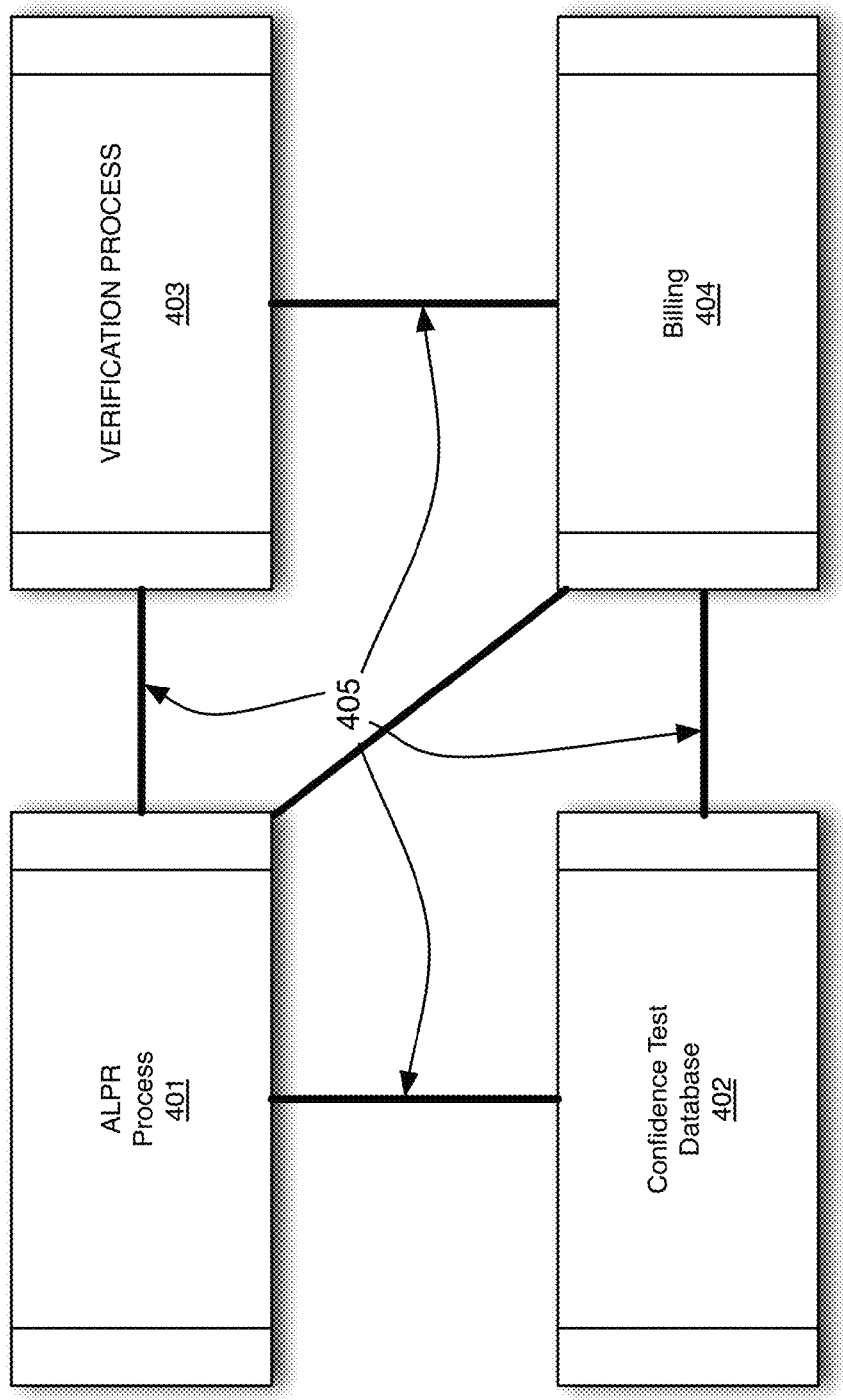
FIG. 4A is a block diagram of main elements of an embodiment of the system.

Major components of the license plate recognition system are shown in FIG. 4A. The System includes an automatic license plate recognition system 401 a confidence test 402 a verification process 403 and a billing process 404 the systems are interconnected 405 to share data and processing. The processes may be operating on a single processor or on a plurality of processors interconnected by a wired network a wireless network or through the Internet or all of the above. Image data is acquired through sensors already described and the automated license plate recognition process identifies the vehicle through recognition of characters on the license plate and other factors. A confidence test estimates the confidence in the identification and if it exceeds a threshold the identification is sent to billing 404. The license plate identification process uses information from the verification process. In one embodiment the information is whether the identified license plate is in a database of possible plates. In another embodiment the information is in a database of frequent users or previously identified, billed and paid plates. The verification process also feed information to the confidence test 402. Nonlimiting information includes whether the licensee plate has been previously identified billed and the bill was paid, which increases the confidence in the identification, whether the license plate is in a possible plate database, whether the identification includes identified vehicle signature factors such as the make and model of the vehicle, and other previously identified visual clues for identification such as color, damage, bumper stickers and whether the characters recognized on the license plate fall into a class of characters that is easily recognized and rarely mistaken for other characters thereby increasing the confidence in the identification of whether the license plate includes characters that are commonly mistaken thereby decreasing the confidence in the identification.

In another embodiment the verification process 403 includes a set of logic rules to require manual verification of the license plate identification. The verification process further includes procedures to ensure the accuracy of the manual review. In one embodiment the procedures include verifying the license plate identification in a batch process of multiple license plates. In one embodiment the multiple plates in the batch include test plates with know identification to test the operators accuracy for the batch of plates being verified. The identification of the batch of plates is not verified unless accuracy thresholds for the test plates meet a minimum required value. The verification process is linked to the billing process 404 in that verification of the plates includes checking whether the same plate has been previously identified and the owner has been billed and whether the owner paid that bill. A completed billing process increases the confidence in the plate identification.

Figure 4B:
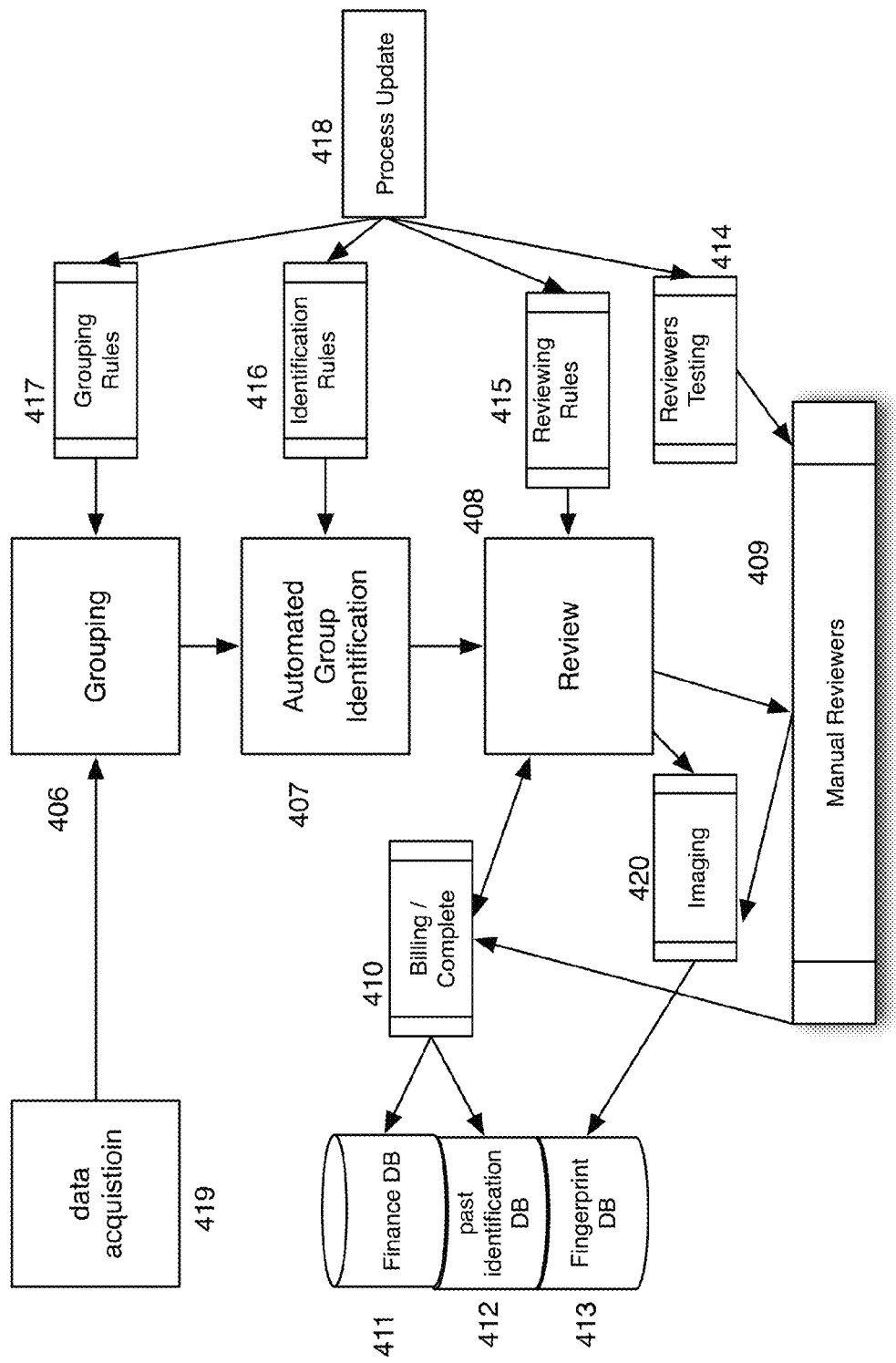
FIG. 4B is a block diagram of main elements showing additional details and perspectives of the system.

Referring now to FIG. 4B a more detailed block diagram, emphasizing other components is shown. Data from remote sensors is acquired 419. The remote sensors are as discussed in conjunction with FIGS. 2 and 3 and are located at tolling or other checkpoints where a vehicle is to be identified. Data includes imaging data of both license plates and vehicles. The data is used by automated optical character recognition systems (OCR) to read the plates and also other features on the vehicles are used to uniquely identify a vehicle in many cases even if the plates cannot be read. In other embodiments the sensors may further include sensors that read radio frequency identification tags on a vehicle and make measurements of the vehicle including vehicle size, shape and weight. In these cases the sensors may include radar sensors, reflected structured light sensors and weight sensors such as strain gauges built into the pavement over which the vehicle is passing. The data acquired from a single vehicle as it passes through a checkpoint is a transaction. The transaction data is passed to a grouping system 406 that takes serial data of transactions and groups related transactions for analysis. In a preferred embodiment the groupings are of the same vehicle seen at multiple points along a road at multiple checkpoints. In another embodiment the grouping is of the same vehicle identified through vehicle signature recognition. The details of identification of the vehicle through vehicle signature recognition are discussed below in conjunction with FIGS. 8A and 8B. In another embodiment the groupings are within a time period that would equate to a single trip for a vehicle along a road and through multiple checkpoints and the grouping is of the transactions at each checkpoint. In another embodiment the groupings are of the same vehicle identified through vehicle signature recognition along the same road in multiple checkpoints without the restriction the grouping is of transactions occurring in a single trip or traversal of the road. That is the transactions may be grouped over a time period that represents identifying the same vehicle on the road over a time of days, weeks or months. The rules to be applied to the grouping 417 are contained in algorithms that may be updated 418 based upon data obtained from ongoing vehicle identifications. In one embodiment the rules add a vehicle signature to identification database 412 that is then available to be used to group transactions of that vehicle in future transactions. In another embodiment the past identification database 412 is updated on the basis of billing information and a finance database 411 that indicates that an identified vehicle's owner was billed for the transaction and in fact paid the bill, thereby offering verification of the accuracy of the transaction. Note the databases 411-413 may in fact all be a single database or may be separate databases even located on separate devices. In this instance the vehicle and plate numbers associated with the vehicle are added to a plausible plate list within the transactions database 412. In another embodiment the customer is billed but instead of paying for the transaction the customer complains that they were not in fact the owner or vehicle identified. In this case the transaction creates an entry in the sensitive plate list of the transactions database and/or financial database and the vehicle matching the signature is flagged as requiring additional, perhaps manual review, in future transactions. That is the grouping may result in one case in an increase in the confidence for all members of the and in another case based upon past data produce a decrease in the confidence level for all transactions within the group each based upon a single member within the group. The grouped transactions then move on to an automated group identification step 407. In this step the characters on the images of the plates within a group are identified through a computing system programmed to use optical character recognition. In one embodiment all of the plate images are identified with optical character recognition and a confidence level is assigned to each identification. If the confidence level for any of the images exceeds a pre-selected threshold then the confidence level for the image with the maximum confidence level is assigned to all of the transaction within the group. The assignment of the confidence level for the OCR to all transactions within a group relies on the grouping of the transactions based upon the vehicle signature recognition. The vehicle signature recognition determines with high confidence that all of the transactions within the group represent the same vehicle and therefore the recognition of the characters on images from one of the transactions implies the same set of characters are on the images from all of the transactions within the group even if the characters on some of the transaction images within the group are not readable. In another embodiment, the vehicle signature recognition determines with high confidence that all of the transactions within the group represent the same vehicle and therefore the recognition of the characters on images from one of the transactions implies the same set of characters are on the images from all of the transactions within the group even if the characters on some of the transaction images within the group are not readable, but the characters recognized are included in a sensitive plate list and have been mistakenly identified in a past transaction and therefore all transaction within the group may be subject to the same mistake. The confidence in the identification for all members of the group is decreased. The rules regarding identification 416 are updated 418 based upon the results of past transactions. In another embodiment the rules for identification are updated based upon the current data stream 419. In one embodiment the lighting for the image acquisition results in poor image quality and therefore the rules for the identification 416 and the reviewing rules 415 are updated to require additional checking on the images or effectively reducing the confidence levels in all of the transactions when the conditions for image acquisition are poor. In another embodiment the rules are updated based upon the condition of the data acquisition equipment. That is if a camera is failing the confidence level for vehicle signature recognition and optical character recognition are lowered for transaction originating from that camera. The system further includes the reviewing process 408. In one embodiment the reviewing process compares the confidence level for the character recognition from the automated identification step 407 and if the confidence level exceeds a pre-selected threshold the identified owner of the vehicle is billed 410 for the transaction. In another embodiment the license plate recognition system is not used for toll road billing but rather to identify vehicles and their movement and the billing 410 represents completion of the process and confirmation of the vehicle on the road at the time of the transaction.

In another embodiment the images are sent for manual review rather than to a billing process or before a billing process. In one embodiment if the plate has not been previously identified by determining if the plate is in the databases 411-413 of past transactions, the plate is sent to manual reviewers 409. In other embodiments the plate is sent for manual review if the confidence limit for the character recognition for the automatic review is below a preselected limit. In another embodiment the images are sent to manual review if the characters within the plate include easily confused characters. In another embodiment the images are sent for manual review if the images is identified as a plate in a sensitive plate list. That is a license plate previously identified and billed where the presumed owner denied the identification. In another embodiment the sensitive plate list is stored in a database 411-413 only if the denial by the owner is confirmed. The manual reviewer reviews the plates to identify or confirm identification of the vehicle and the characters on the plates. In one embodiment the reviewer reviews a single image from a group of images and applies the results of that review to all images within the group. In one embodiment a reviewer is given a plurality of images to review the plurality including images from different groups of images where the groups have been identified as being the same vehicle through vehicle signature recognition. That is the reviewer is given batches of images to review, some related and some not. Another embodiment includes testing 414 the accuracy of the reviewer. In one embodiment the testing includes interspersing know difficult images within the batch of images presented to the reviewer. In one embodiment the difficult images include images that include easily confused characters. In one embodiment if the reviewer fails to accurately identify the test images the confidence levels for the results for all the images within a batch are reduced. In another embodiment if a reviewer fails to identify the test images the reviewer's results for the batch are rejected and the batch is sent to another reviewer for review. If the characters within the reviewed images are identified, images are selected 420 from the identified images to be used for vehicle signature recognition in future reviews and the transaction is passed on to billing 410 where the customer is billed. In one embodiment images are not added to the confirmed database until the customer is billed and pays for the transaction. In another embodiment the images are stored in a sensitive plate database if the customer is billed but denies the identification.

Figure 4C:
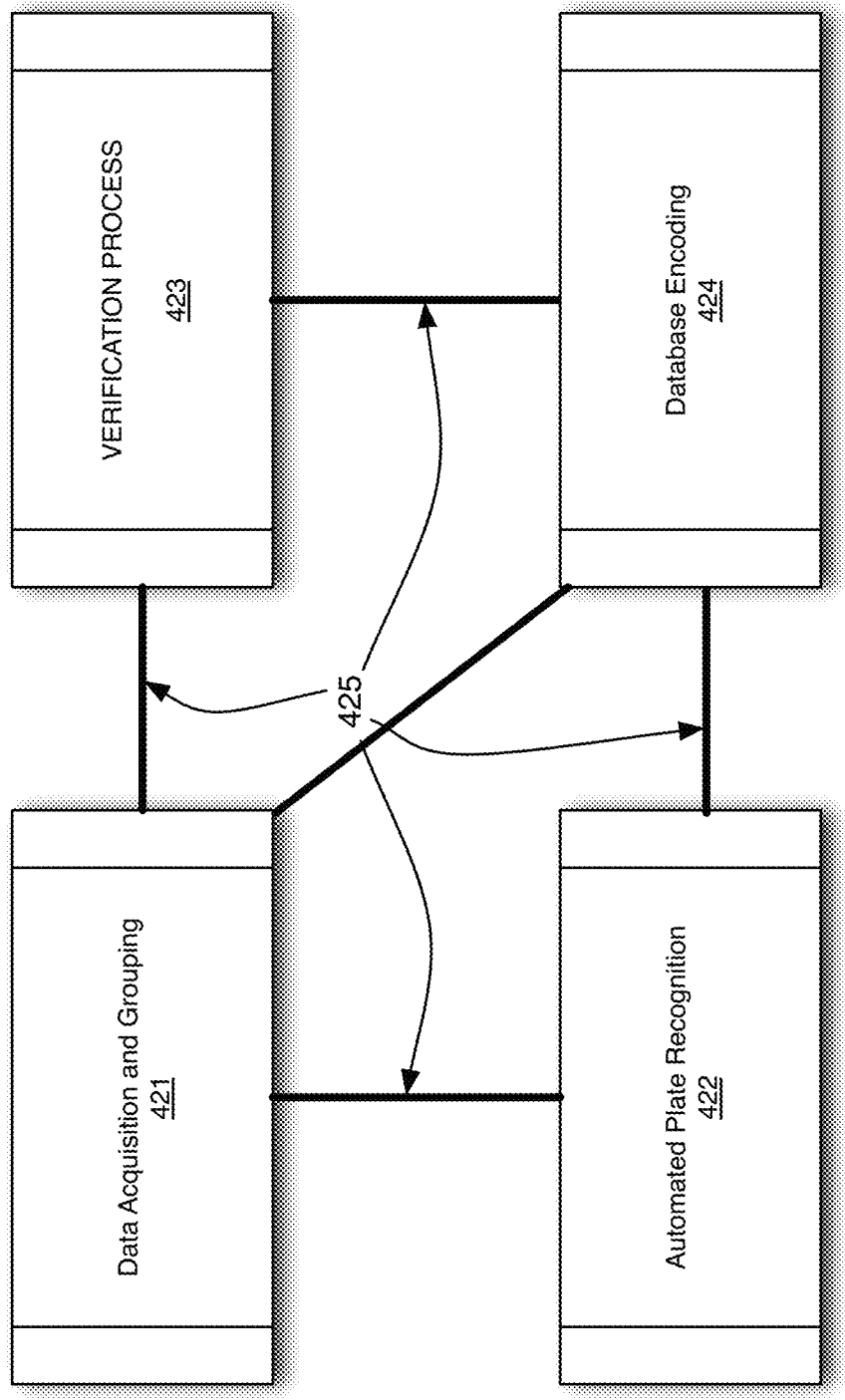
FIG. 4C is a block diagram of other main elements of an embodiment of the system.

In another embodiment, major components of the license plate recognition system are shown in FIG. 4C. The System includes a data acquisition and grouping process 421 that includes acquiring images of a vehicle at a toll point or checkpoint on a roadway and grouping those images identified though image matching or other means as belonging to the same vehicle. Images are acquired at multiple points along the roadway and at multiple times. Acquisition of a set of images at a particular checkpoint or toll point is termed a transaction. Images from multiple transactions are grouped. Grouping means identifying images that include the same vehicle without reading or recognizing the characters on the license plate. Logically once the characters on a license plate are read and recognized the vehicle is uniquely identified by correlation of the characters with those contained in a vehicle registration database. Grouping is a step prior to character recognition that allows improved automation and accuracy of the character recognition process. The grouped images are passed to an automated plate recognition process 422 that recognizes the characters of the license plate and uniquely identifies the vehicle. The process makes use of the fact that multiple transaction are grouped by using the multiple data points provided by a group to reduce the number of different images to which character recognition need be applied, or with images where their may be only partial recognition of the characters on the plate providing a second or more data point to help recognize all the characters on the plate and to make an improved estimate of the confidence level in the character recognition on the plate by pooling confidence levels from the multiple grouped transactions. The results of the automated plate recognition 422 are also verified 423.

In one embodiment the verification process 423 includes checking that the identification of the characters on the license plate is consistent with data in a registration database.

The type, make, model and color of the vehicle as included in a registration data base are compared with the type, make, model and color of the vehicle identified on the roadway. In one embodiment the registration database is the license plate registration database. In another embodiment the registration database is a database of transactions where the same vehicle has been previously identified on the same roadway.

Another embodiment includes encoding of the database 424. In a preferred embodiment the database is encoded as images such that verification 423 includes matching images. The processes are all interconnected 425. The data acquisition is used to update database and improve the verification process. Once data is verified it is entered into the database for use in future verification processes. Although in preferred embodiment follow the flow charts as described herein, in other embodiment the process may be mixed and matched in other orders. As an example in the preferred embodiment, the grouping of the data 421 is done prior to the automated plate recognition process. In another embodiment grouping is not done until the verification 423 process. In this embodiment transactions may be identified individually but are verified as a group. The automated calculation steps may occur simultaneously in some environments. For example in some environments the initial multiple images of grouped transactions are acquired, grouped and OCR performed all simultaneously or nearly so in a multi-thread computing environment. Grouped images are then analyzed for confidence levels of the OCR and rules discussed elsewhere regarding grouped transactions are applied.

Figure 5:
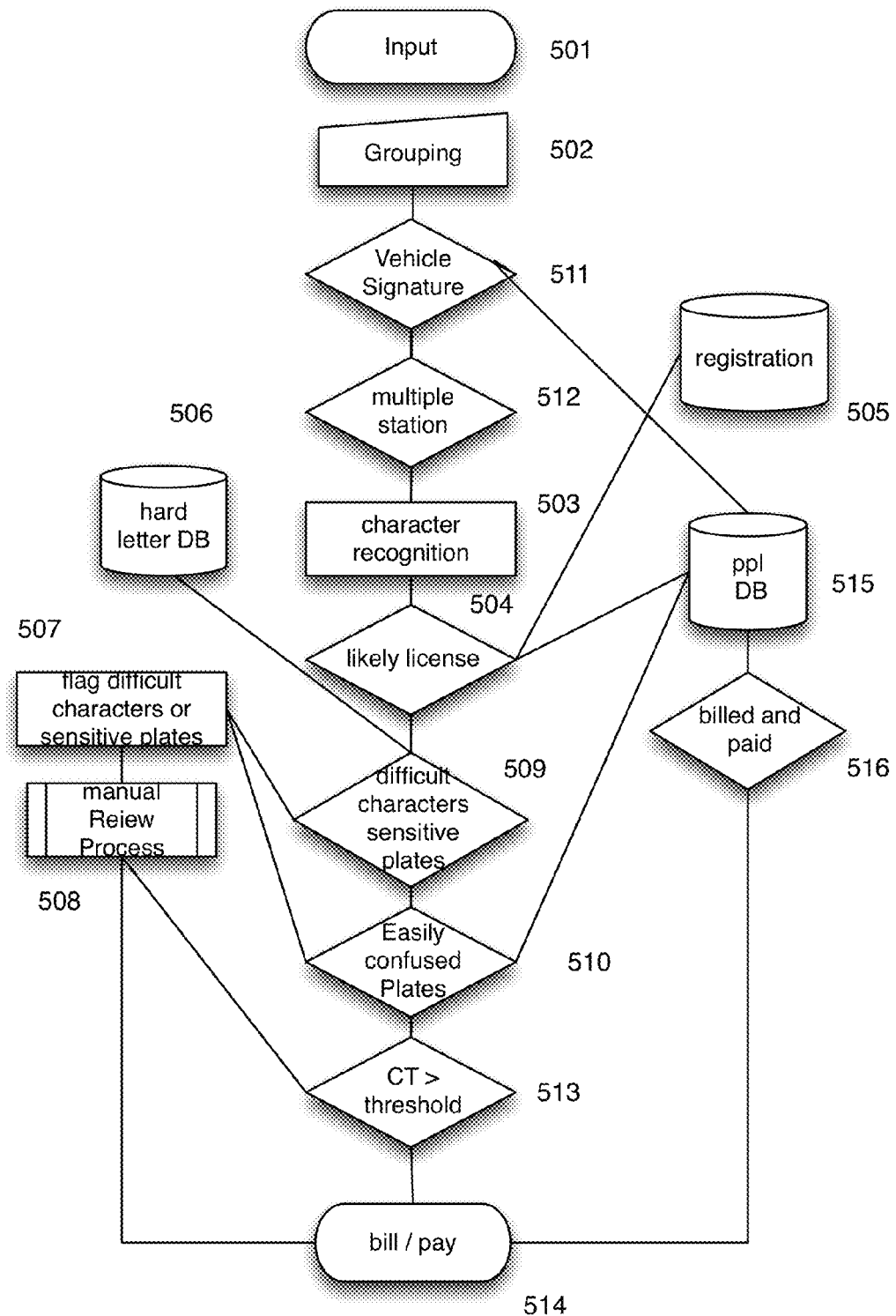
FIG. 5 is a flow chart showing a plate image recognition process.

Considering now FIG. 5 more details of a license plate recognition process are shown. The process is initiated 501 with the acquisition of image and other data from sensors. An image or group of images and any other data acquired at a checkpoint constitute a transaction. Transactions include all vehicle information as well as time and date when the transaction occurred and the location of the checkpoint.

In another embodiment features other than the characters on the license plate itself are used to aid the recognition process. In one embodiment features other than recognition of the characters are used to group transactions 502 as being flagged as the same vehicle even if the identification of the particular vehicle is not known. Transactions known to be from a single vehicle through a recognition process are grouped 502. Wherever new identification parameters are used to identify transactions as being from the same vehicle those transactions may be grouped. Transactions may be grouped as being from the same vehicle on the basis of image features in the acquired images of the vehicle 501. Nonlimiting other factors that may be used to aid in grouping include the state that issued the license plate, whether the license plate includes other features such as images, the make of the vehicle, the model of the vehicle, damage or other distinguishing features on the vehicle that have been previously seen and verified. In one embodiment vehicle information includes information from other sensors such as radio frequency identification tags that provide an identification of the vehicle that is separate from the registration data for the vehicle. In another embodiment the character recognition further considers whether the vehicle has been seen in a logical progression at multiple stations 512. If a license plate character set is independently recognized at repeated stations and the timing between the repeated stations is consistent with a reasonable speed for vehicles between those stations then the confidence in the recognition is increased. The vehicle recognition at multiple stations may further include the factors and processes discussed above including likely license, difficult characters, easily confused plate and vehicle signature. In one embodiment the multiple factors and processes are combined to verify multiple transactions. As a nonlimiting example if a plate recognized at a first station that further includes a vehicle feature and that factor is not detected in a subsequent station then the multiple station effect on the confidence of the recognition is decreased. If the vehicle signature factor is detected in both stations then the confidence in the recognition as a result of multiple station recognition increases.

The licenses plate is automatically located in the images field based upon location, color of the localized image and individual characters on the plate known to be on license plates from past history. The characters are recognized using character recognition software known in the art. The recognized plate is tested 504 against likely license plates. Likely license plates include comparison with a database 505 from registration of plates. In another embodiment the recognition is tested against a database of probably plates 515. The probable plates database includes previously recognized plates that have been billed and paid the bill 516.

The recognized characters are compared 504 to the contents of a database containing known difficult to recognize letters. The database of difficult characters may be populated empirically by correlating with errors in previous recognition tests. In another embodiment the difficult characters database is populated a priori by those character groups having minimal difference in their image. Nonlimiting exemplary a priori difficult characters are the group of letters O, D and Q and the number 0. Another a priori difficult character group is B and 8. Another a priori difficult group includes the letter B and the numbers 3 and 8. Another a priori difficult character group includes the letter L and the number 1. In one embodiment if recognition of the license plate includes difficult characters the characters are flagged 506 and forwarded to manual review 508. In another embodiment difficult plates are identified as those whose characters have been previously identified yet the owner denied the identification during a billing process.

Another embodiment further includes flagging of easily confused plates 510. In one embodiment a plate where a past character recognition has determined there to be known difficult characters and further there are two plates with the same group of characters in the probable plate database a manual review is initiated. In a nonlimiting example of the logic a plate with the characters AB124 is detected where the letter B is known to be a difficult character as easily confused by automatic and even manual recognition with the numeral 8. The following table of potential actions is programmed to select the appropriate review process:

1. If AB124 is in probable plate database and A8124 is not in the probable plate database and AB124 has been previously verified no review is required.
2. If AB124 is not in the probable plate database initiate manual review.
3. If AB124 and A8124 are both in the probable plate database initiate manual review Although shown with the a priori known difficult characters of B and 8 the logic would apply to any scenario where known difficult characters appearing in the same or adjacent positions within a license plate would lead to a manual review process. In another embodiment the presence of known difficult characters creating a set of easily confused plates is used to adjust the confidence of the character recognition result. This is further discussed in conjunction with FIG. 9 below.

The previous recognition process steps 501-512 produce a confidence measurement in the identification of the characters of the plate. The confidence measurement is then compared 513 to a preset threshold. In one embodiment if the measured confidence is greater than a threshold the identification is confirmed and the customer is billed 514. If the confidence measurement is less than a threshold the identification proceeds to a manual review process 508. If the manual review process results in an identification that has a confidence limit that exceeds a preselected threshold the customer is then billed 514. If the client is billed and in fact pays 516 the database of probable plates is updated 515. In other embodiments the ordering of the steps in FIG. 5 are changed. In one embodiment the character recognition is done prior to vehicle signature determination 511 and grouping of the transactions 502. In another embodiment the character recognition is used to group transactions.

Figure 6A:
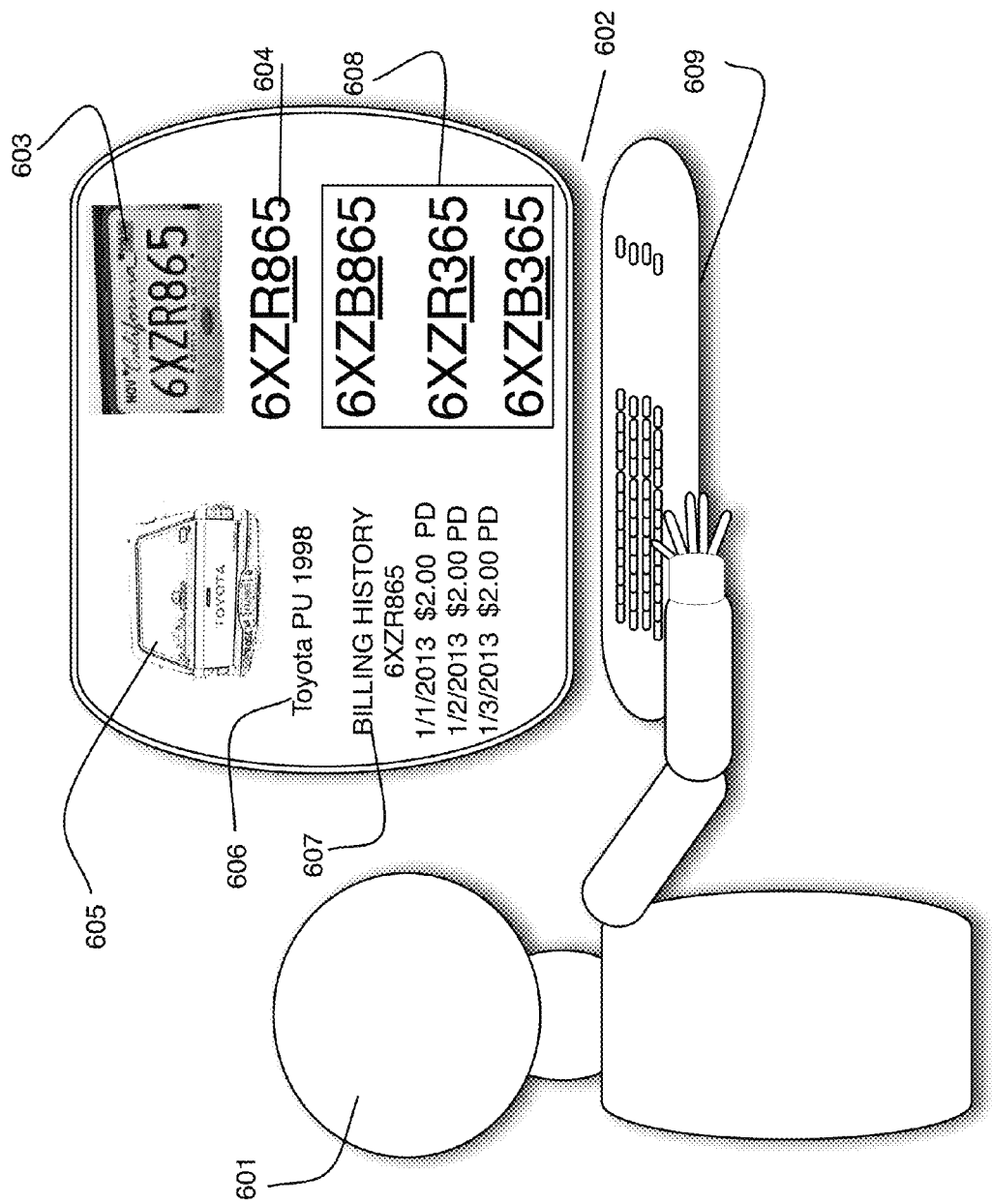
FIG. 6A is a diagram showing elements of a manual review process.

FIG. 6A shows a diagram of the features included in a manual review process. A reviewer 601 is using a computing device 602. The device 602 is programmed to display information regarding identification of the characters of a license plate. The device displays the image 603 and other data that the system has acquired to identify a vehicle and the associated license plate. In one embodiment a single transaction is displayed. In another embodiment data from a plurality of transactions is displayed. In one embodiment the display includes characters 604 that have been automatically detected. In another embodiment no automatically characters are displayed and the reviewer 601 is required to input all of the characters of the license plate image displayed 603 and the system automatically checks the reviewer's results against the results of automated character recognition. In another embodiment automated character recognition includes use of all the systems as described in FIG. 5 including automated grouping and character determination on the basis of identification of the transaction as being within a group where another transaction has been positively identified based upon a confidence estimate that exceeds a pre-selected threshold. In one embodiment the characters that are known to be difficult characters, in this case R and 8 are highlighted to alert the operator. In one embodiment the device further displays an image 605 of the vehicle. In another embodiment the device further displays additional vehicle signature data 606. Additional vehicle signature data in the example includes the manufacturer (Toyota) the type of vehicle (PU or pickup truck) and the model year (1998). In the example shown the vehicle signature information includes the make, model and year of the vehicle. In another embodiment no vehicle signature is included and the reviewer sees only the license plate image 603. In another embodiment the reviewer sees multiple license plate images 603 from all transactions that have been determined to be in the same group. In another embodiment the device further displays information 607 from a probable plate database regarding historic identification of the automated detected plate. In the example shown the plate 6XZE865 has been billed on three previous occasions and paid the bills. In another embodiment plates that are identified as easily confused plates are displayed 608. In one embodiment the easily confused plates are chosen on the basis of having difficult characters from the same group as those in the automated detected character set. In the example shown the characters R and B are identified as being in the same group of difficult characters as are the character 8 and 3. Characters are identified as being difficult characters and being in the same group so as to be more likely to be confused with one another either a priori based upon the similar appearance of the letters or empirically based upon historic identifications of license plate characters and errors that have been detected. In one embodiment letters are placed in a difficult characters group if the letters have a history of being confused and the error rate for the letters being confused in a group exceeds a pre-selected threshold. The manual review process further includes a means 609 for the operator to interact with the computing device, here a keyboard, but otherwise a mouse or touch display are other examples. The operator then through the input device selects or in another embodiment inputs the correct identification of the characters of the plate in the image 603. The information input is then added to possible plate database or sent to billing to bill the owner of the identified plates. In another embodiment the results are used to further update databases related to easily confused characters.

Figure 6B:
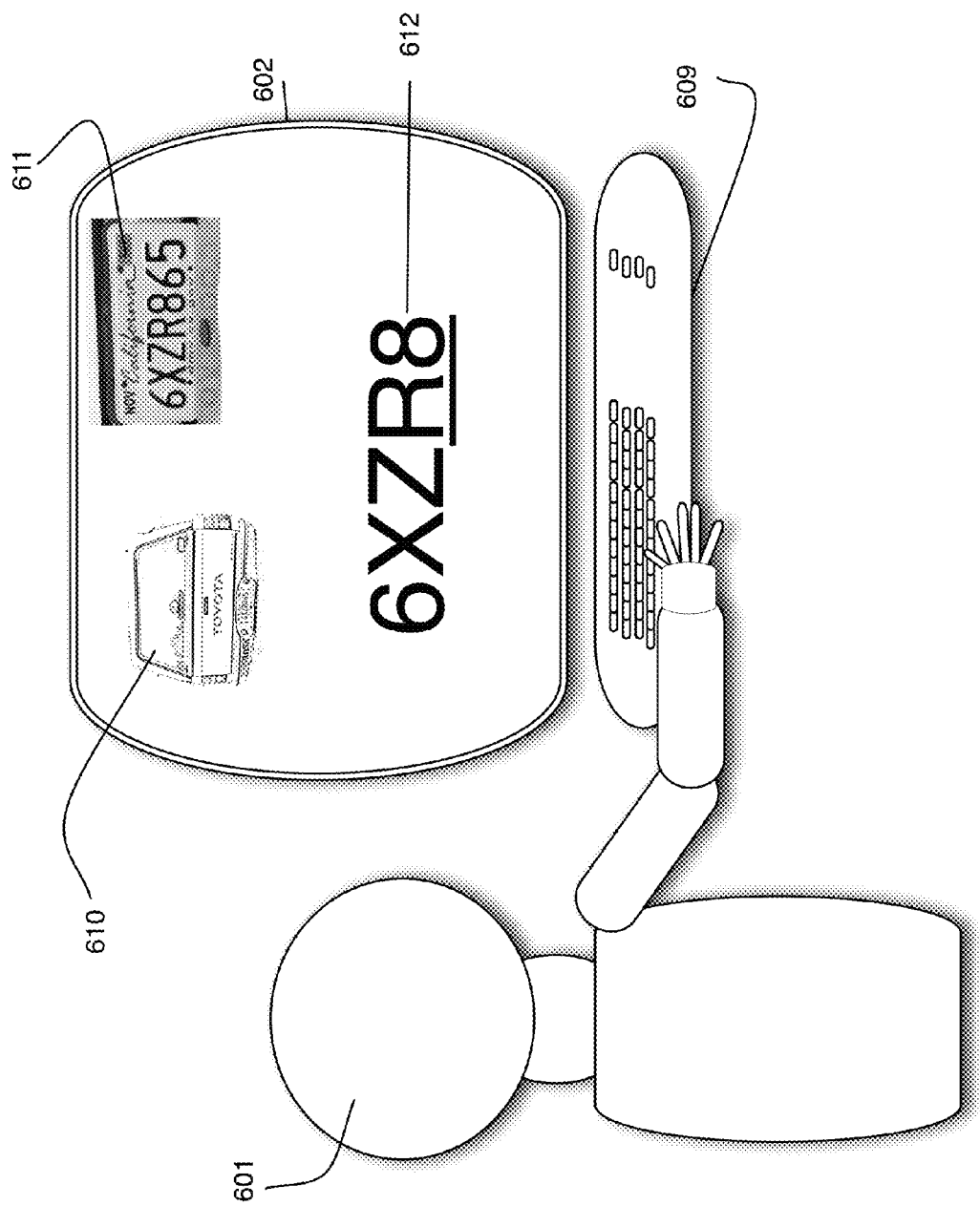
FIG. 6B is a diagram showing additional elements of a manual review process.

In another embodiment shown in FIG. 6B the reviewer 601 is presented with images 610, 611 of a vehicle on a screen 602. The reviewer is not prompted with potential character identifications but rather type in on a keyboard 609 their identification of the license plate characters. As they type in the characters, difficult or easily confused characters may be highlighted 612 on the screen. Highlighting of the characters includes underline, coloring differently, using a different font and flashing the characters after being typed. In one embodiment the characters are highlighted only in cases where the particular viewer has previously done poorly with the particular difficult characters. That is the difficult characters will be highlighted if it is judged the reviewer is likely to make errors and will not be highlighted if it is judged the reviewer is not likely to make errors. Such a practice enhances learning and attentiveness of the reviewer and avoids learning fatigue from the same characters always being highlighted. In one embodiment the decision of whether to highlight the difficult characters is made on the basis of that reviewers results in identifying test images that is interspersed with the actual image data. In another embodiment the manual review process is a double blind review process. A first reviewer is presented the images and without prompting (blind to any previous identification) reads and enters his judgment of the characters in the image. The review then continues to a second reviewer who similarly is presented the images with out prompting or knowledge of the previous reviewer or automated results. A match of the both reviewers in this double blind test provides a high confidence that the characters are correctly identified. Actual confidence levels are calculated based upon empirically determined results of applying the procedure to a database of known images. In one embodiment the known images and the confidence levels are determined on the basis of historic real data and the characters are determined to be known on the basis of billing and payment by the vehicle owner. In one embodiment the confidence levels are unique to a particular reviewer. In another embodiment the confidence levels are unique to a pair of reviewers.

Figure 6C:
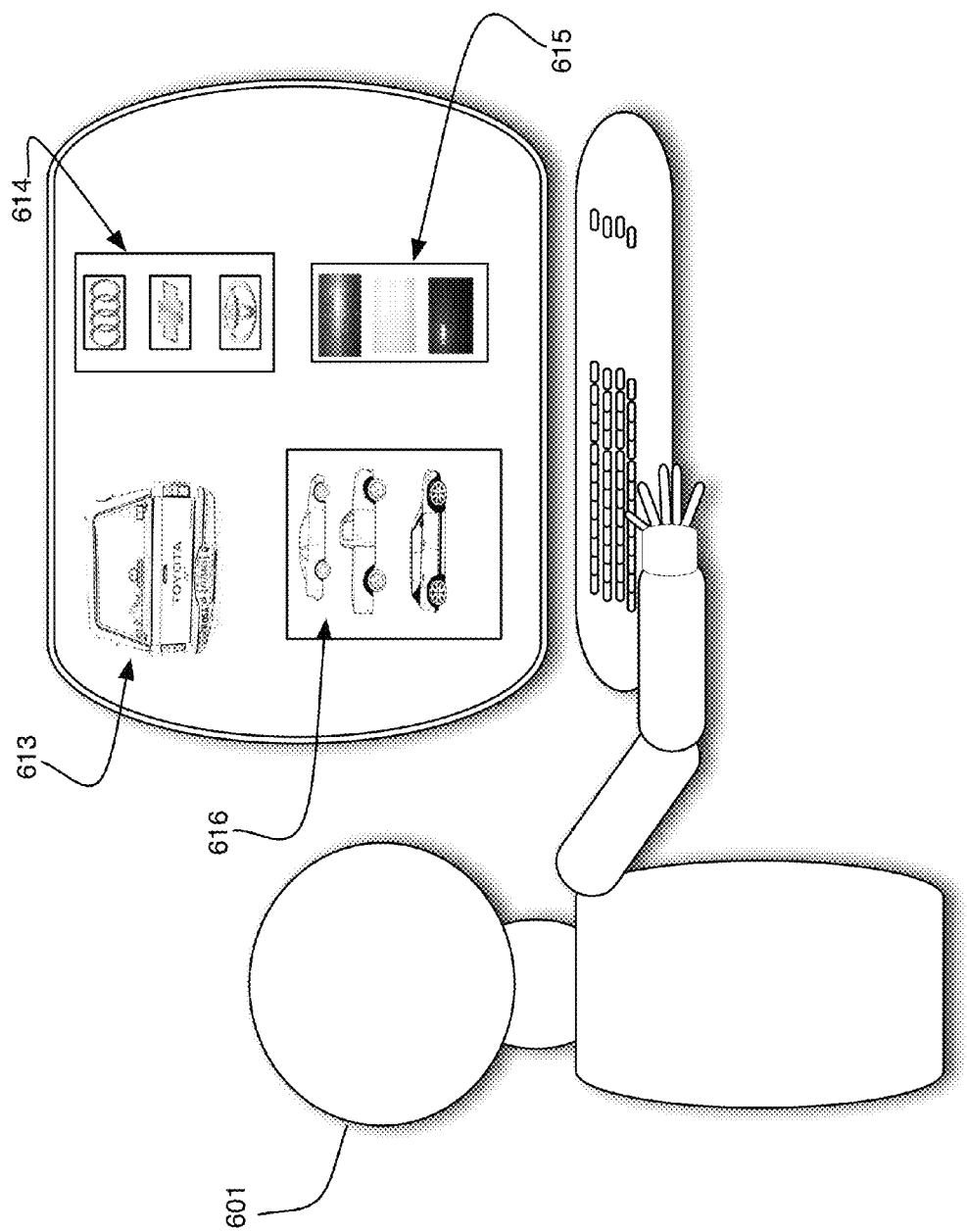
FIG. 6C shows a manual review process using pictorial data.

In another, preferred, embodiment shown in FIG. 6C vehicle signature database information is encoded visually as images. A reviewer 601 is presented with the acquired data image of a vehicle 613. Verification of the features and identity of the vehicle are done through image matching. The reviewer matches the image of manufacturer brand emblems 614 to an emblem seen on the vehicle. The image brand emblems 614 shown are registered trademarks of Audi AG Corporation of Germany (top), the General Motors Corporation of the United States (middle) and Toyota motor corporation of Japan (bottom). Similarly the reviewer matches vehicle color in the acquired data image 613 to color "swatches" 615 and to vehicle types 616. In one embodiment the image data 614, 615, 616 resides in a database of images that represent encoded vehicle registration information. In another embodiment the images within the database represent an image encoding of the Vehicle identification number that uniquely identifies each vehicle.

Figure 7:
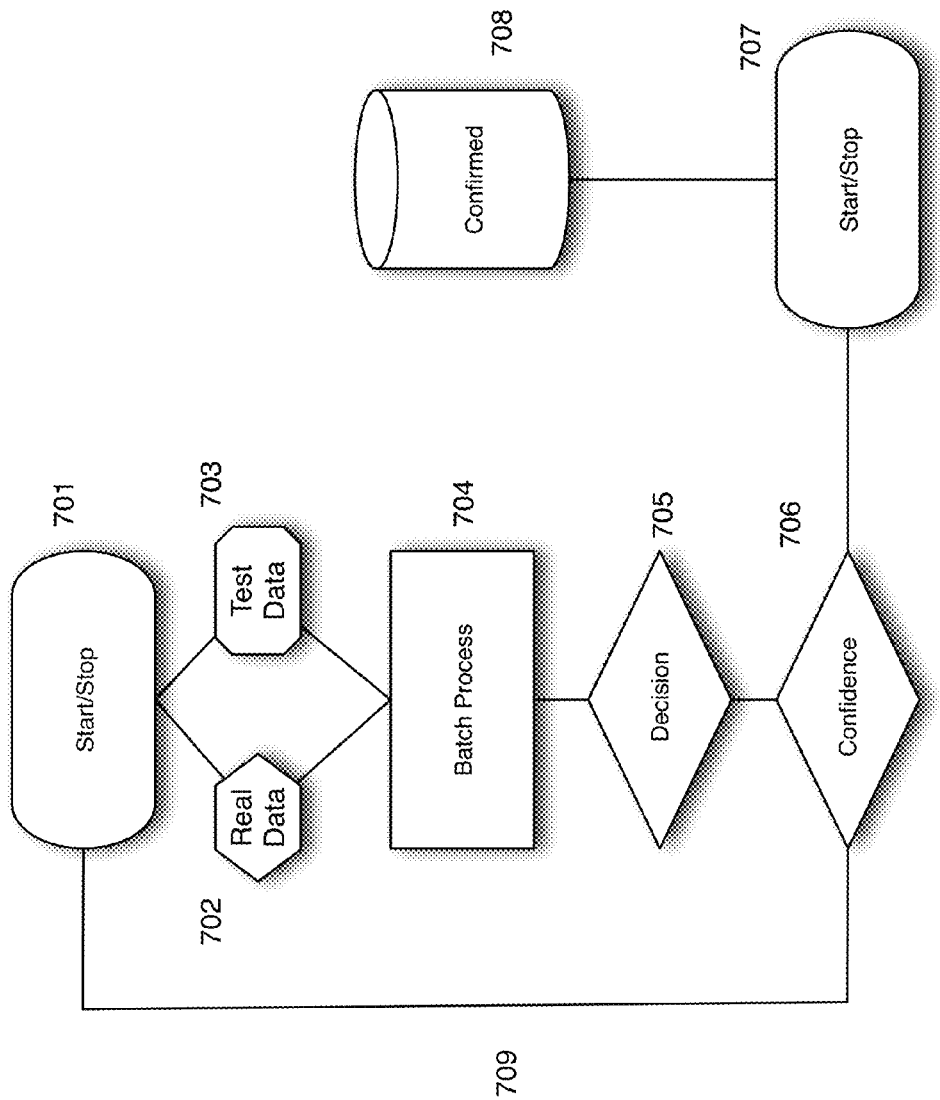
FIG. 7 is a flow chart for elements of a manual review process.

FIG. 7 shows further features of another embodiment of the manual review and verification process. The process is begun 701 by presenting information as shown and discussed in FIG. 6 to an operator. The process however is not completed sequentially one image at a time. A batch process is used. The data is fed to the manual reviewer intermixed with real data 702 and test data 703. Test data appears identical to real data however it is data prepared to test the accuracy of the reviewer. The reviewer reviews a pre-selected quantity of images and information 704 and for each has provided sequentially a decision 705 regarding the characters recognized for the plates. The test data provides an estimate of the error rate for the reviewer for the particular batch and if the confidence in the results exceeds a pre-selected limit the identification of the plates in the particular batch is completed 707 and the data is passed on to a confirmed identification 708 for billing. If the confidence is less than a pre-selected value the path 709 is followed and the data is reviewed again (to 701) by either the same reviewer or a different reviewer. In one embodiment confidence is measured by the number of errors on the test data identification.

Figure 8:
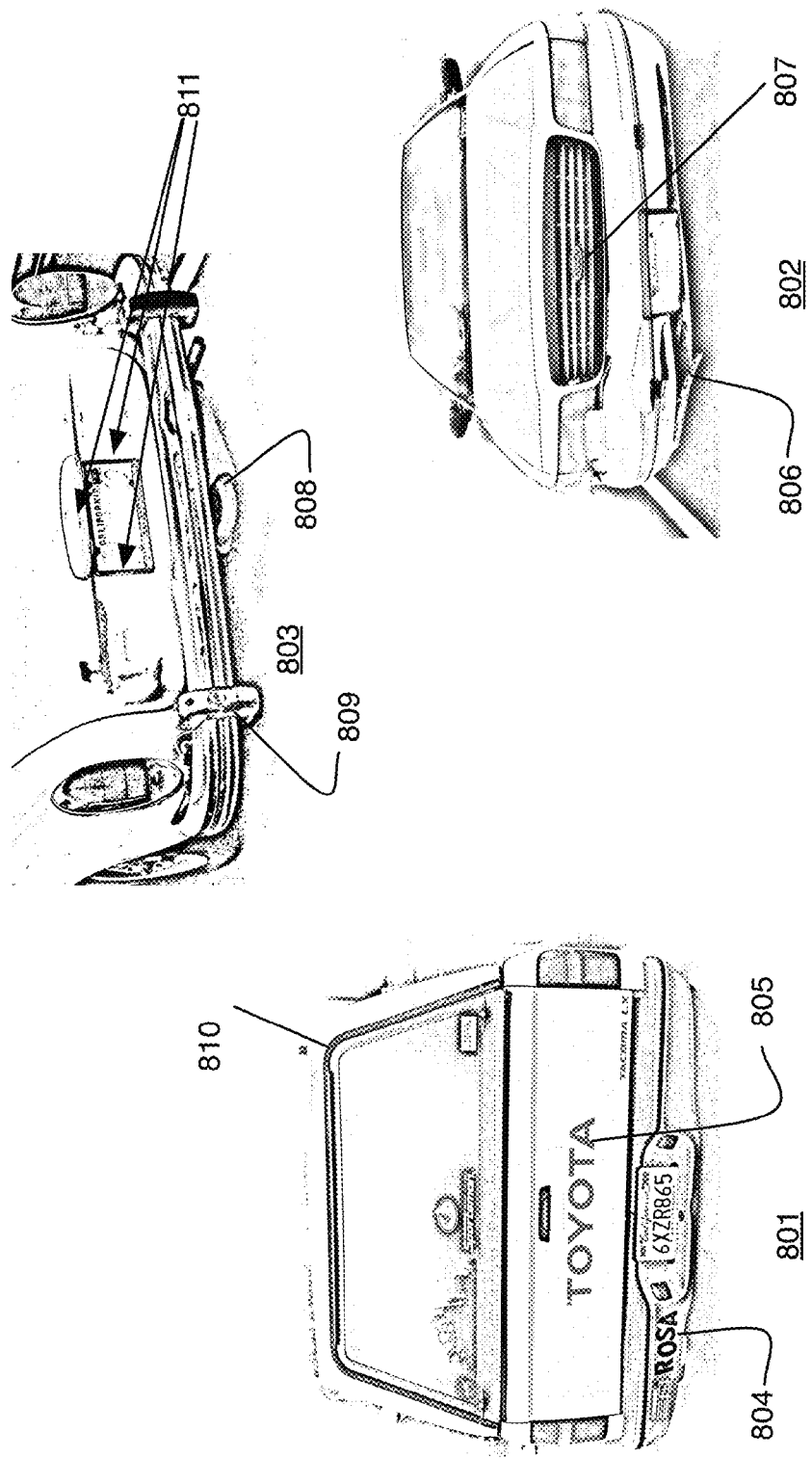
FIG. 8 is a set of images showing some vehicle signature elements used to improve the license plate recognition.

Examples of vehicle signature information are shown in FIG. 8. Partial images of three different vehicles 801, 802, 803 are shown. Non-limiting examples of vehicle signature information include the make of the vehicle as shown by lettering 805 or brand elements 807 on the vehicle. Vehicle signature information may also include information such as a bumper sticker 804 or the fact that a pickup includes a camper shell 810. In some case vehicle signature information includes damage 806 to the vehicle, missing parts 809 (the bumper guard is missing on the left hand side) and structural elements 808. In one embodiment vehicle signature data has different weighting when used to confirm or estimate the confidence in a character recognition procedure. As an example, damage to a vehicle 806 is given a lower weighting than the vehicle make and model as damage to a vehicle has a higher likelihood of being transitory since the owner is likely to have damage repaired. Similarly bumper stickers may have a lower weighting than the make and model but a higher weighting than damage.

In a preferred embodiment vehicle grouping is done using details of the image, in the example shown in the neighborhood of the license plate and vehicles are identified by matching of edges and lines 811, that is high contrast elements between vehicle images to enable determination that multiple images are of the same vehicle and grouping of images so identified as being of the same vehicle. In another embodiment colors within the license plate area 811 are used to identify vehicle images as being images of a vehicle that is registered in a particular state based upon characteristic color patterns within that state's license plates.

Figure 9A:
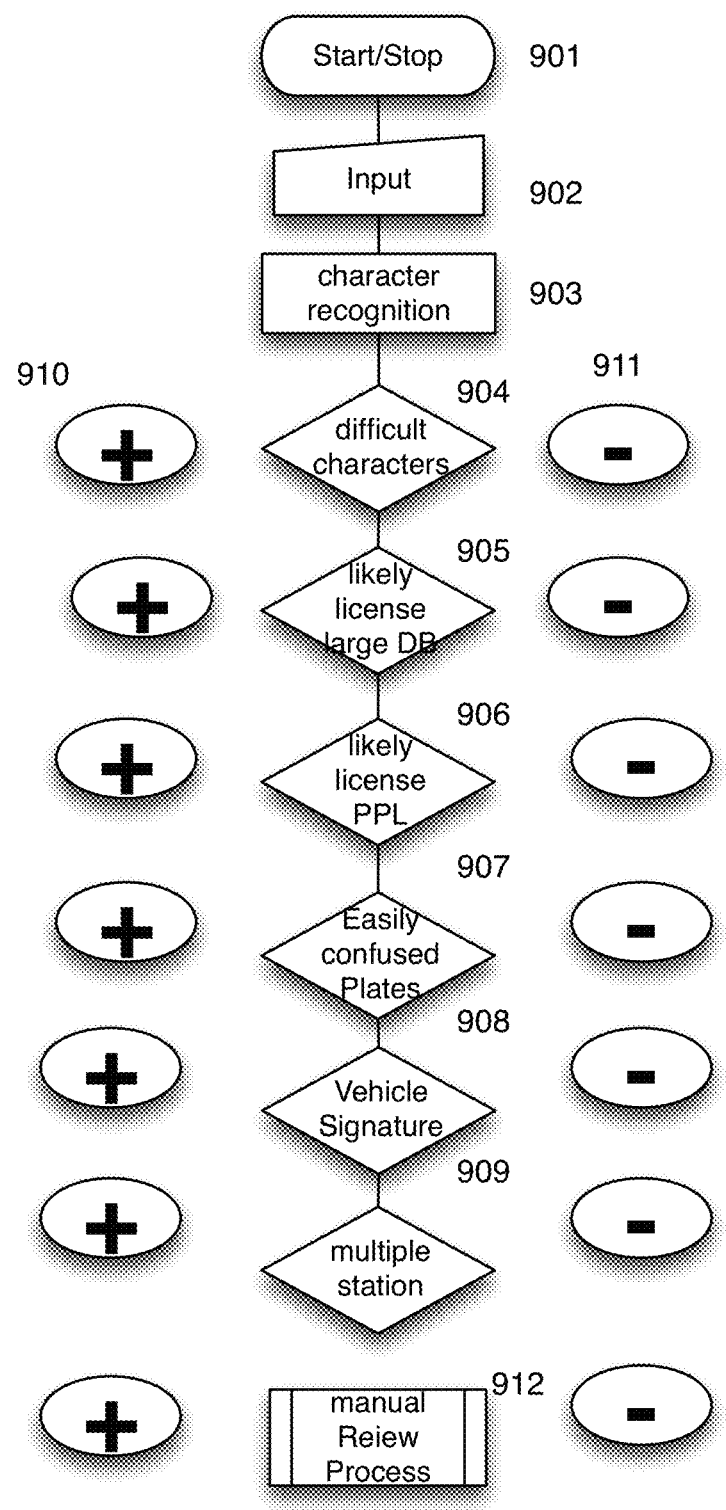
FIG. 9A is a diagram of elements used in the process for estimating the confidence of a license plate read.

FIG. 9A shows diagrammatically a process to estimate the confidence in a character recognition process. Although shown with the appearance of a flow chart not all the steps are completed in the order shown or perhaps even completed at all for a particular recognition process. The process starts 901 with data acquired 902 and an automated character recognition process 903. The automated character recognition 903 is followed by a series of process steps each contributing positively 910 or negatively 911 to the estimated confidence in the character recognition. The first automated character recognition step produces an estimate of the confidence in the recognized characters. In one embodiment the confidence estimate is determined empirically based upon character recognition of a database of know license plate images and the accuracy of the character recognition step for a given set of characters in the plate being recognized. The first automated step is followed by a series of process steps 904-909 and 912 that contribute either positively 910 or negatively 911 to the estimate of the confidence in the character recognition. In any particular recognition of license plate characters not all of the steps are used. The process for selecting steps has been described. The recognized characters are tested to determine if difficult characters 904 are included in the recognized set of characters for the license plate being recognized. In one embodiment the contribution to the confidence estimate is determined empirically based upon past history of character recognition for a similar set of plates. In another embodiment the contribution to the confidence estimate is determined separately for different types of difficult characters. For example it may be determined that characters of the group B, 3, 8 contribute differently to the confidence estimate than does the group O, Q, D. Therefore separate contributions to the confidence estimate are made when these letters are detected as present in the automated character recognition step. The recognized characters of the plate may be detected as members of a large database of all plates for a particular state or region 904 and as such would have a positive impact on the estimate of the confidence estimate. If the set of recognized characters is not a member of the possible plates in the state or regional database this could have a negative contribution to the confidence estimate. Both the positive and negative impacts are determined empirically. Similarly a contribution is provided for membership or lack thereof in a probable plate database 906. In one embodiment the probable plate database is composed of past recognized plates where the owners have been billed and paid. Again the contribution can be determined empirically based upon historical data. Similarly the detection of easily confused plates, use of vehicle signatures 908 and recognizing the characters at successive stations 909 all contribute to the confidence estimate. As before the contributions are determined empirically based upon historical data. In the case of vehicle signature features different types of features may contribute differently to the confidence estimate. The make and model may be determined empirically to have a larger impact upon the confidence estimate than say a bumper sticker or indication of body damage on the vehicle. Finally a manual review process 912 may be initiated and as before an empirical contribution to the confidence interval may be estimated based upon historic data. In another embodiment the contribution to the confidence estimate for the manual review is determined from the accuracy measured using known images interspersed with actual data with images reviewed in a batch process as has been described. In one embodiment the FIG. 9A represents a cost model function for determining confidence limits. In the preferred embodiment the parameters for determining the confidence limits are determined from empirical data of known verified data of recognized plates acquired from vehicles.

Figure 9B:
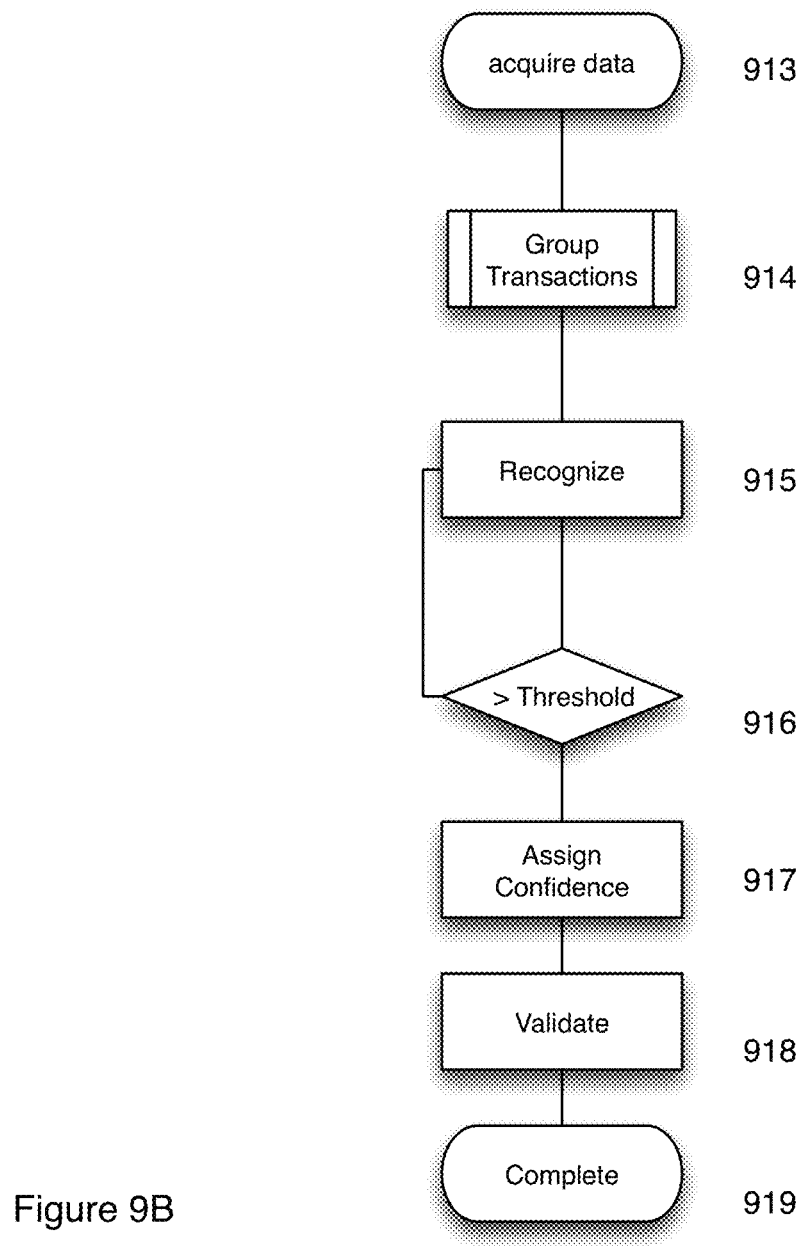
FIG. 9B is a flow chart showing using of confidence estimates.

Referring to FIG. 9B the application of grouping to transaction confidence estimate is shown. Data for a transaction is acquired 913 as has already been discussed. Transactions are grouped as being identified as being from the same vehicle. At least one member of the group is recognized 915 and the confidence level for the recognition is tested 916 against a pre-selected threshold. If the confidence level exceeds the threshold the confidence level for the transaction is assigned 917 to the other members of the group and the process is completed 918 through billing, updating of databases and so forth as already described. If the confidence level is found 916 not to be greater than the pre-selected threshold a second member of the group is recognized 915 as indicated by the return path. In one embodiment the threshold of an individual recognition must exceed the threshold for the group confidence level to be assigned as exceeding the threshold. In another embodiment the second recognition is combined with the first and if they agree a new confidence level for the two recognition is calculated and the combined confidence level is assigned to the group. The confidence level for the group may arise from a single transaction within the group being recognized or a plurality of members of the group being recognized. For example if in a group of five transaction a first transaction is identified at a confidence level of 80% and this is found to be below a pre-selected threshold of 90% confidence required to confirm the transaction. A second member of the group is also independently recognized with the same recognition result and a confidence level of 80%. The combined confidence levels will be greater than 80% and can be assigned to the group. In one embodiment the combination formulation is set empirically based upon the tolerance of the system for recognition errors. In another embodiment the combination algorithm is determined empirically and the algorithm is a multivariate function of the factors discussed in conjunction with FIG. 9.

Figure 10:
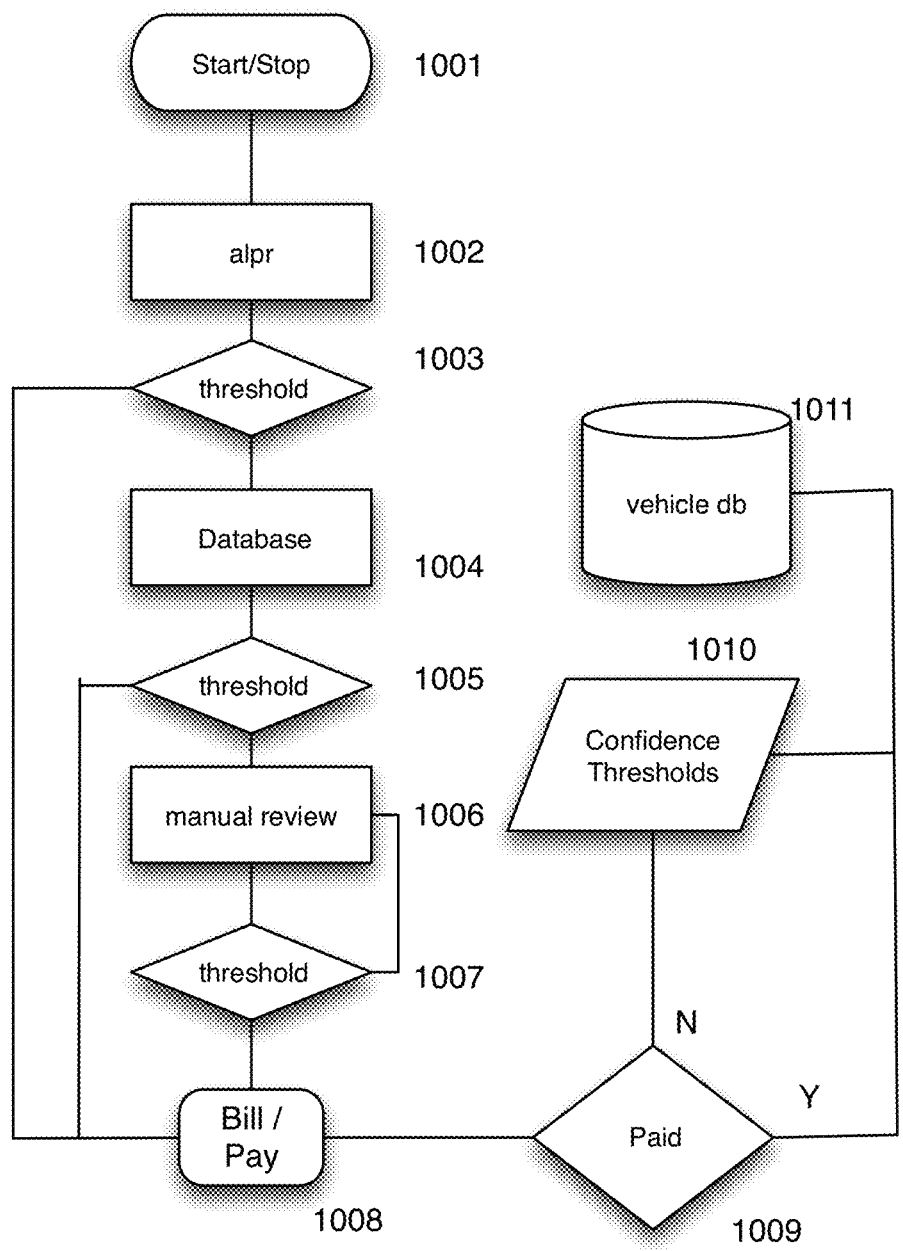
FIG. 10 is a flow chart for updating databases based upon recognition results.

The confidence estimate for the character recognition described above is used as in the exemplary process of FIG. 10. Again FIG. 10 is only an exemplary process as it does not include all of the process already discussed as available and the process presented may occur in different order, but those skilled in the art should comprehend the process and possible variations. The process begins 1001 with acquisition of license plate date. Data may include one or more images of the license plate and in some embodiments one or more images of the vehicle. The characters in the image of the license plate are automatically recognized 1002. This recognition produces an estimate of the confidence in the recognition as described above. The confidence estimate is compared 1003 against a pre-selected threshold for the confidence estimate and actions are taken based upon this comparison. In one case the confidence in the recognition is high and exceeds a preselected threshold and the process goes directly to billing the owner of the vehicle. In another case the confidence is less than a preselected threshold and further identification steps are warranted in the example shown whether the plates are part of one of several databases 1004 is a further test. The test against the databases provides a revised estimate of the confidence in the recognition and the revised estimate is again tested against a preselected threshold 1005. In one embodiment the preselected threshold is the same as used in the previous test 1003. In another embodiment the preselected threshold is different for different particular added processes. Again actions are taken based upon the comparison. In the example shown if a threshold is exceeded the process may go to the billing process as described. If the threshold is not met a manual review process may be initiated. The process for manual review is as described in conjunction with earlier figures. Again the manual review process produces a revised estimate of the confidence in the character recognition which then is may result in proceeding to billing or repeating the manual review process. In a rare instance (not shown) the manual review process may result in a judgment that the plate is not readable. Once billed if the customer pays the bill this is used as further confidence in the recognition result. Whether the bill is paid or not is used to update the empirical determination of confidence estimates and thresholds 1010. In such a fashion the system can be self-improving with improved confidence estimates over time. Additionally the fact of being paid or not is also updated in the vehicle probable plate database 1011.

Figure 11:
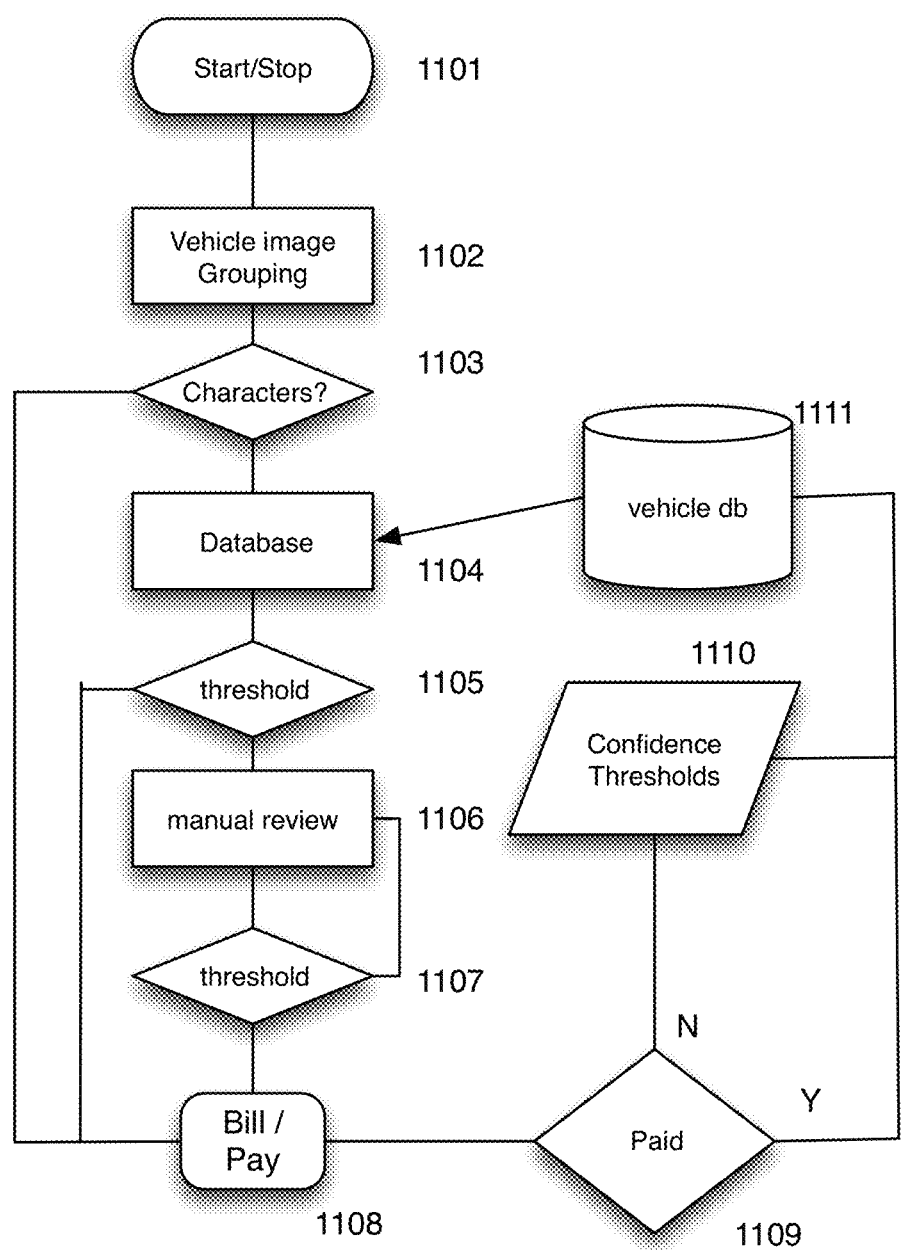
FIG. 11 is a diagram of a system for using past data to improve the confidence estimate.

In another embodiment, shown in FIG. 11, image data for multiple transactions is captured 1101. The image data is analyzed 1102 to determine whether the same vehicle appears in multiple images and to group those images. The grouping may or may not include the ability to read any of the characters of the license plate. The further review 1103-1111 applies to the group of transactions of identification of the same vehicle. The group of transactions may arise from a single trip of the same vehicle through multiple imaging points along the road or may result from multiple trips of the same vehicle through the same imaging point. In one embodiment the multiple images and transactions are acquired over an extended period of time. In one embodiment the period of time is hours and in another embodiment the period of time is multiple days. In one embodiment a single image from the grouped image is further analyzed and verified 1103-1111 for character recognition and if need be manual review 1106. The identification further includes accessing a database 1104 of plates that have previously been identified on the same section of road from which the image was acquired. In one embodiment high probability of being on the road and therefore being in the database is a vehicle and plate previously identified results in the identification being verified and assigned a higher confidence level. By grouping transactions from the same vehicle the analysis and review burden is reduced from multiple identification to identification of a single image. The confidence in the automatic analysis is compared 1105 to a threshold value as previously discussed and if the confidence is high the process proceeds to billing 1108. If the confidence level does not meet the minimum threshold a manual review 1106 is initiated. Again the confidence in the identification is compared to a threshold 1107 and if sufficiently high the process proceeds to billing 1108. If the confidence in a first manual review does not exceed a pre-selected threshold the process returns to a manual review in this case by a second, different reviewer who has not seen the results of the first manual review. In one embodiment each manual review is a blind review process with the reviewer not being privy to the automated or previous manual reviewer results.

Figure 12:
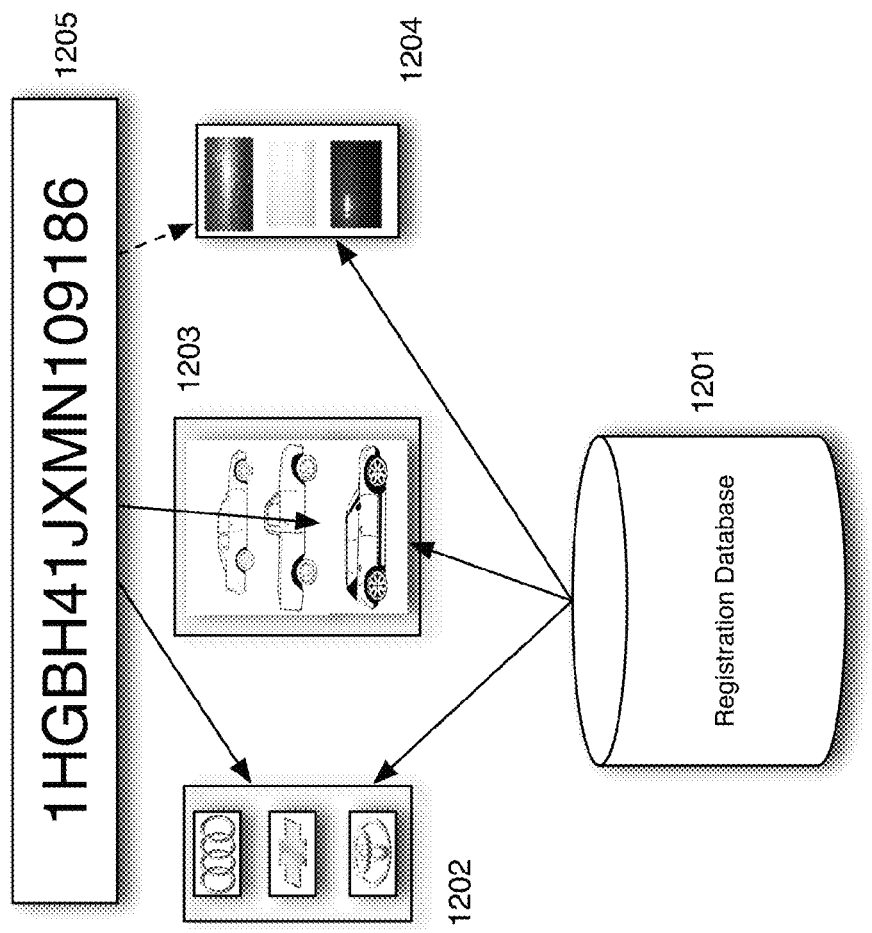
FIG. 12 is a diagram showing pictorial encoding of a database.

In another embodiment shown in FIG. 12 the database of vehicle registration 1201, as is typically maintained by state, country or region of the location of the vehicle is encoded as images 1202, 1203, 1204. In one embodiment the vehicle model is encoded as an image of the branding badges 1202 found on the vehicle. The vehicle type is encoded as an image of the particular type 1203 of vehicle and the vehicle color is encoded as a color swatch 1204. In the images shown multiple choices for each of the vehicle signature data are shown however in practice the encoding would be to a single brand, vehicle type and color. In another embodiment the vehicle identification number (VIN) 1205 is encoded to a set of images. In the example shown the encoding of the color of the vehicle is shown as a dotted line to signify that not all VINs include information as to the color of the vehicle. The encoded images are then used in the verification processes discussed above.

SUMMARY

A license plate recognition and review system and processes are described. The system uses a plurality of processes and databases in various combinations to recognize characters in a license plate and provide a confidence estimate for that recognition.

Those skilled in the art will appreciate that various adaptations and modifications of the preferred embodiments can be configured without departing from the scope and spirit of the invention. Therefore, it is to be understood that the invention may be practiced other than as specifically described herein, within the scope of the appended claims.

What is claimed is:

1. A method for identifying characters on license plates of a vehicle on a roadway said method comprising:
   a) acquiring from an electronic camera, a plurality of electronic images of the vehicle said images including the license plate area,
   b) recognizing image features in the electronic images of the vehicle that do not include recognition of the characters of the vehicle's license plate,
   c) grouping the electronic images that are determined to be of the same vehicle, the determination based upon the image features in the electronic images of the vehicle that do not include recognition of the characters on the vehicle's license plate,
   d) analyzing a single image from the grouped image to recognize the characters of the license plate,
   e) assigning the recognized characters from the single image to all images of the grouped images,
   f) calculating a confidence level for the recognition of the characters and if the confidence interval exceeds a preselected value using the recognized characters to identify the vehicle and an owner and if the confidence level is less than a preselected value initiating a manual review of the image for character recognition, and,
   g) assigning the confidence level for one image within the group of images to all other images within the group,
   h) wherein the steps a)-g) are performed automatically by the computer processor.

2. The method of claim 1 further including a verification process said verification process including determining, by the computer processor, if the recognized characters and identified vehicle have been previously identified on the same roadway and if so automatically verifying the recognized characters and vehicle.

3. The method of claim 1 wherein the manual review includes manually reviewing by a human operator groups of images from different vehicles in a batch of images, said batch of images including known previously identified images interspersed with the images acquired from passing vehicles and calculating the confidence level for the manual review of images acquired from passing vehicles on the basis of the results of review of the known previously identified images wherein the batches of images and the previously identified images are automatically selected by the computer processor.

4. The method of claim 2 wherein the verification process includes comparing, by the computer processor, the at least one acquired image with images in an image database, said image database including at least one of images of vehicle brand emblems, images of vehicle colors, images of vehicle types and images of vehicle models, and said database images being an encoding of vehicle registration information.

5. A computer processor implemented method for automatically identifying characters on license plates of a vehicle on a roadway said method comprising:
   a) acquiring from an electronic camera, a plurality of electronic images of the vehicle said images including the license plate area,
   b) recognizing image features in the electronic images of the vehicle that do not include recognition of the characters of the vehicle's license plate,
   c) grouping the electronic images that are determined to be of the same vehicle, the determination based upon the image features of the vehicle that do not include recognition of the characters on the vehicle's license plate,
   d) analyzing a single image from the grouped image to recognize the characters of the license plate,
   e) assigning the recognized characters from the single image to all images of the grouped images,
   f) calculating a confidence level for the recognition of the characters and if the confidence interval exceeds a preselected value using the recognized characters to identify the vehicle and an owner and if the confidence level is less than a preselected value initiating a manual review of the image for character recognition,
   g) wherein the manual review includes reviewing groups of images from different vehicles in a batch of images, said batch of images including known previously identified images interspersed with the images acquired from passing vehicles and calculating the confidence level for the manual review of images acquired from passing vehicles on the basis of the results of review of the known previously identified images.

6. The method of claim 5 wherein the confidence level for one image within the group of images is assigned by the computer processor to all other images within the group.

7. The method of claim 5 further including a verification process said verification process including determining, by the computer processor, if the recognized characters and identified vehicle have been previously identified on the same roadway and if so automatically verifying the recognized characters and vehicle.

8. The method of claim 7 wherein the verification process includes comparing, by the computer processor, the at least one acquired image with images in an image database, said image database including at least one of images of vehicle brand emblems, images of vehicle colors, images of vehicle types and images of vehicle models, and said database images being an encoding of vehicle registration information.

9. A computer processor implemented method for automatically identifying characters on license plates of a vehicle on a roadway said method comprising:
   a) acquiring from an electronic camera a plurality of electronic images of the vehicle said image including the license plate area at multiple points along the roadway, the plurality of images from a single point along the roadway being a transaction,
   b) recognizing image features in the electronic images of the vehicle that do not include recognition of the characters of the vehicle's license plate, the image features being vehicle signature information,
   c) grouping transactions from the multiple points identified as being of the same vehicle identification based upon the image features that do not include character recognition of the characters on the license plate of the vehicle,
   d) analyzing the images in each transaction to recognize the characters of the license plate and assigning a confidence level to the recognition of the characters for each of the transactions,
   e) verifying the recognition of the characters, verification including comparing the vehicle signature information from the transaction images with vehicle information in a registration database and if the vehicle signature information from the transaction matches the vehicle information in the vehicle registration database verifying the correctness of the character recognition for the grouped transactions,
   f) calculating a confidence level for the recognition of the characters and if the confidence interval exceeds a preselected value using the recognized characters to identify the vehicle and an owner and if the confidence level is less than a preselected value initiating a manual review of the image for character recognition, and, g) assigning the confidence level for one transaction within the group of transactions to all other transactions within the group.

10. The method of claim 9 wherein the manual review includes manually reviewing by a human operator groups of transactions from different vehicles in a batch of transactions, said batch of transactions including known previously identified transactions interspersed with the transactions acquired from passing vehicles and calculating the confidence level for the manual review of transactions acquired from passing vehicles on the basis of the results of review of the known previously identified transactions wherein the batches of transactions and the previously identified transactions are automatically selected by the computer processor.

11. A computer processor implemented method for automatically identifying characters on license plates of a vehicle on a roadway said method comprising:

a) acquiring from an electronic camera, a plurality of electronic images of the vehicle said image including the license plate area at multiple points along the roadway, the plurality of images from a single point along the roadway being a transaction, b) recognizing image features in the electronic images of the vehicle that do not include recognition of the characters of the vehicle's license plate, the image features being vehicle signature information, c) grouping transactions from the multiple points identified as being of the same vehicle identification based upon image features that does not include character recognition of the characters on the license plate of the vehicle, d) analyzing the images in each transaction to recognize the characters of the license plate and assigning a confidence level to the recognition of the characters for each of the transactions, e) verifying the recognition of the characters, verification including comparing the vehicle signature information from the transaction images with vehicle information in a registration database and if the vehicle signature information from the transaction matches the vehicle information in the vehicle registration database verifying the correctness of the character recognition for the grouped transactions, f) calculating a confidence level for the recognition of the characters and if the confidence interval exceeds a preselected value using the recognized characters to identify the vehicle and an owner and if the confidence level is less than a preselected value initiating a manual review of the image for character recognition, and, g) wherein the manual review includes reviewing groups of transactions from different vehicles in a batch of transactions, said batch of transactions including known previously identified transactions interspersed with the transactions acquired from passing vehicles and calculating the confidence level for the manual review of transactions acquired from passing vehicles on the basis of the results of review of the known previously identified transactions.

12. The method of claim 11 wherein the confidence level for one transaction within the group of transactions is assigned by the computer processor to all other transactions within the group.

* * * * *